United States Patent
Iwata et al.

(10) Patent No.: US 9,591,177 B2
(45) Date of Patent: Mar. 7, 2017

(54) IMAGE FORMING APPARATUS

(71) Applicants: Muneaki Iwata, Kanagawa (JP);
Masaaki Ishida, Kanagawa (JP); Naoto Watanabe, Kanagawa (JP); Hayato Fujita, Kanagawa (JP)

(72) Inventors: Muneaki Iwata, Kanagawa (JP);
Masaaki Ishida, Kanagawa (JP); Naoto Watanabe, Kanagawa (JP); Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/725,343

(22) Filed: May 29, 2015

(65) Prior Publication Data
US 2015/0350491 A1    Dec. 3, 2015

(30) Foreign Application Priority Data
Jun. 3, 2014   (JP) ................. 2014-114731

(51) Int. Cl.
*H04N 1/04*    (2006.01)
*H04N 1/40*    (2006.01)
(Continued)

(52) U.S. Cl.
CPC ............. *H04N 1/40* (2013.01); *G03G 15/043* (2013.01); *H04N 1/00* (2013.01); *H04N 1/00246* (2013.01); *H04N 1/02815* (2013.01)

(58) Field of Classification Search
CPC ... H04N 1/40; H04N 1/02815; H04N 1/00246
(Continued)

(56) References Cited

U.S. PATENT DOCUMENTS 6,498,617 B1    12/2002 Ishida et al.
2002/0130944 A1    9/2002 Ema et al.
(Continued)

FOREIGN PATENT DOCUMENTS

JP    2007-174571 A    7/2007
JP    4622850    11/2010
(Continued)

OTHER PUBLICATIONS

Extended European Search Report issued Oct. 7, 2015 in Patent Application No. 15170133.1.
(Continued)

*Primary Examiner* — Houshang Safaipour
(74) *Attorney, Agent, or Firm* — Oblon, McClelland, Maier & Neustadt, L.L.P.

(57) ABSTRACT

An image forming apparatus forms an image by optical scanning. The image forming apparatus includes: a light source; an image processing unit that processes image data; a modulation signal generation unit that generates a light source modulation signal; a light source drive unit that drives the light source based on the light source modulation signal; and a correction value identifying unit that identifies a correction value for correcting a registration error of an image to be formed. The image processing unit performs first image processing of image data with first resolution based on a correction value identified by the correction value identifying unit, the first image processing including deformation processing and gradation processing of the image data. The modulation signal generation unit converts image data processed in the image processing unit into image data with resolution higher than the first resolution and performs second image processing.

20 Claims, 18 Drawing Sheets

(51) Int. Cl.
*H04N 1/028* (2006.01)
*H04N 1/00* (2006.01)
*G03G 15/043* (2006.01)

(58) Field of Classification Search
USPC .................................. 358/475, 474, 498, 497
See application file for complete search history.

(56) References Cited

U.S. PATENT DOCUMENTS

| | | |
|---|---|---|
| 2003/0067533 A1 | 4/2003 | Omori et al. |
| 2003/0156184 A1 | 8/2003 | Suzuki et al. |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0132828 A1 | 6/2007 | Ishida et al. |
| 2007/0165283 A1 | 7/2007 | Matsuzaki et al. |
| 2007/0242127 A1 | 10/2007 | Omori et al. |
| 2008/0088893 A1 | 4/2008 | Ishida et al. |
| 2008/0123160 A1 | 5/2008 | Omori et al. |
| 2008/0218813 A1 | 9/2008 | Tanabe et al. |
| 2008/0239336 A1 | 10/2008 | Tanabe et al. |
| 2009/0091805 A1 | 4/2009 | Tanabe et al. |
| 2010/0045767 A1 | 2/2010 | Nihei et al. |
| 2010/0214637 A1 | 8/2010 | Nihei et al. |
| 2011/0176842 A1* | 7/2011 | Fukamachi ........ G03G 15/0189 399/301 |
| 2012/0293783 A1 | 11/2012 | Ishida et al. |
| 2013/0243459 A1 | 9/2013 | Omori et al. |
| 2013/0302052 A1 | 11/2013 | Iwata et al. |
| 2014/0139603 A1 | 5/2014 | Fujita et al. |
| 2014/0139605 A1 | 5/2014 | Fujita et al. |
| 2014/0176656 A1 | 6/2014 | Omori et al. |
| 2014/0268186 A1 | 9/2014 | Iwata et al. |
| 2014/0327938 A1 | 11/2014 | Ishida et al. |
| 2014/0333940 A1 | 11/2014 | Iwata et al. |
| 2014/0333941 A1 | 11/2014 | Iwata et al. |

FOREIGN PATENT DOCUMENTS

| | | |
|---|---|---|
| JP | 4882426 | 12/2011 |
| JP | 5017910 | 6/2012 |

OTHER PUBLICATIONS

U.S. Appl. No. 14/585,383, filed Dec. 30, 2014.
U.S. Appl. No. 14/556,745, filed Dec. 1, 2014.

* cited by examiner

DETECT NUMBER OF BLACK PIXELS IN TARGET REGION

FIG.24
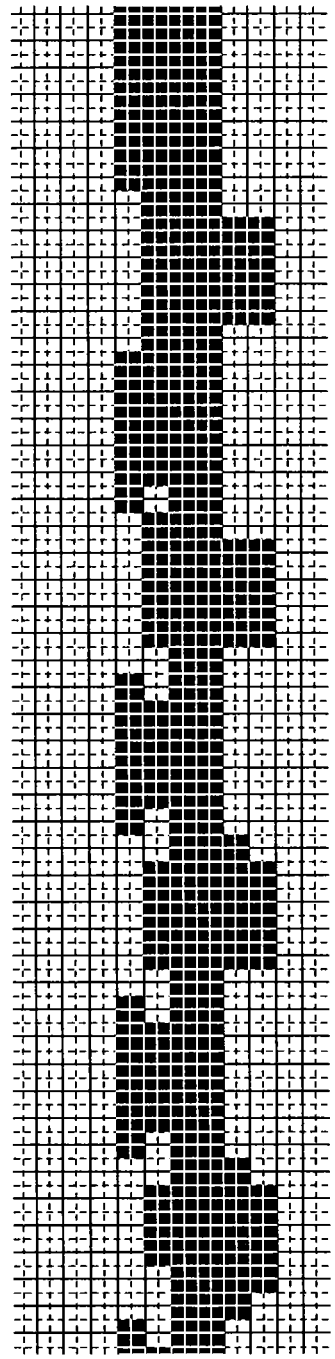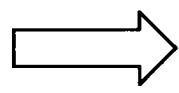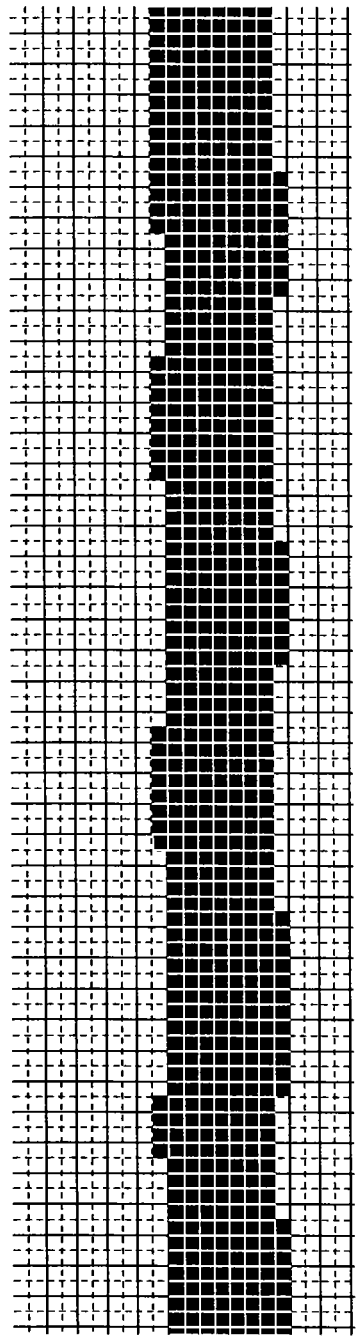
(A) AFTER POSITION CORRECTION AND GRADATION PROCESSING
(B) AFTER CONVERSION INTO HIGH RESOLUTION

IMAGE FORMING APPARATUS

CROSS-REFERENCE TO RELATED APPLICATION(S)

The present application claims priority to and incorporates by reference the entire contents of Japanese Patent Application No. 2014-114731 filed in Japan on Jun. 3, 2014.

BACKGROUND OF THE INVENTION

1. Field of the Invention

The present invention relates to an image forming apparatus.

2. Description of the Related Art

In recent years, digital printers employing electrophotographic process have been popularly used in the field of production printing. Higher resolution and higher reliability are thus required of digital printers employing the electrophotographic process. In particular, for digital printers employing the electrophotographic process, the improvement in the accuracy of positioning between a front side and a back side (registration) is required. In the digital printer employing the electrophotographic process, shrinking of sheets during thermal fixing process occurs. So that if when no process is applied to the image data in two-sided printing, misregistration between the front side and the back side occurs.

To solve the problem, the digital printer performs position correction of input image data such as rotation, scaling, or shifting. For an accuracy of the process, most of digital printers perform position correction of multi-bit data with high resolution of, for example, 1200 dpi or 2400 dpi.

The digital printer employing the electrophotographic process includes a photoconductor drum having a photoconductive scan surface, a light source which emits a laser beam, a polygon mirror for deflecting the laser beam emitted from the light source, and a scanning optical system for introducing the laser beam deflected by the polygon mirror to the surface of the photoconductor drum (scan surface). The digital printer employing the electrophotographic process modulates the light flux emitted from the light source based on image data and irradiate the scan surface with the resulting light flux so as to scan the scan surface to produce an electrostatic latent image corresponding to the image data on the photoconductor drum.

An element having a plurality of luminous points, such as a laser diode array (LDA) and a vertical cavity surface emitting laser (VCSEL), is used for the light source of the digital printer employing the electrophotographic process. With this configuration, the digital printer employing the electrophotographic process can produce an electrostatic latent image with resolution, for example, 2400 dpi or 4800 dpi, which is higher than that of image data with 1200 dpi.

The digital printer performs processing of an image with such high resolution to precisely rotate, scale, or shift the image. The digital printer can thus perform precise registration between the front and back sides through the image processing with high resolution.

When image processing is performed with high resolution, however, a problem occurs when transferring data to the light source driving circuit in the downstream of the image processing unit. For example, when the image processing unit performs processing of multi-bit data with the resolution of 2400 dpi or 4800 dpi, flexibility of image processing is increased and reproducibility of small letters and lines of 1200 dpi is also increased. However, the high density image processing significantly increases the amount of data to be transferred to the light source driving circuit provided in the downstream of the image processing unit, which limits the rate of production and thus productivity.

JP 4622850 B discloses a technique to perform processing with high resolution in a required section through performing correction by two stages, that is, pre-correction and post-correction, so as to reduce the required memory. The technique disclosed in JP 4622850 B however cannot reduce the amount of transferred data.

JP 5017910 B and JP 4882426 B disclose techniques of performing correction after gradation processing. In the processing of registration between the front and back sides after the gradation processing, however, the problem of interference with the dithering disallows correction with a large dynamic range.

In view of the above, there is a need to provide an image forming apparatus that performs precise position correction of an image before gradation processing and performs image processing with high resolution without increasing the amount of transferred image data.

SUMMARY OF THE INVENTION

It is an object of the present invention to at least partially solve the problems in the conventional technology.

An image forming apparatus forms an image by optical scanning. The image forming apparatus includes: a light source; an image processing unit that processes image data; a modulation signal generation unit that generates a light source modulation signal; a light source drive unit that drives the light source based on the light source modulation signal; and a correction value identifying unit that identifies a correction value for correcting a registration error of an image to be formed. The image processing unit performs first image processing of image data with first resolution based on a correction value identified by the correction value identifying unit, the first image processing including deformation processing and gradation processing of the image data. The modulation signal generation unit converts image data processed in the image processing unit into image data with resolution higher than the first resolution and performs second image processing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 24 illustrate an example of a lateral line drawing processed through position correction and gradation processing and the lateral line drawing processed through conversion to have high resolution.

DETAILED DESCRIPTION OF THE PREFERRED EMBODIMENTS

A color printer 2000, which is an example of an image forming apparatus, will be described in detail as an embodiment according to the present invention referring to the attached drawings.

Figure 1:
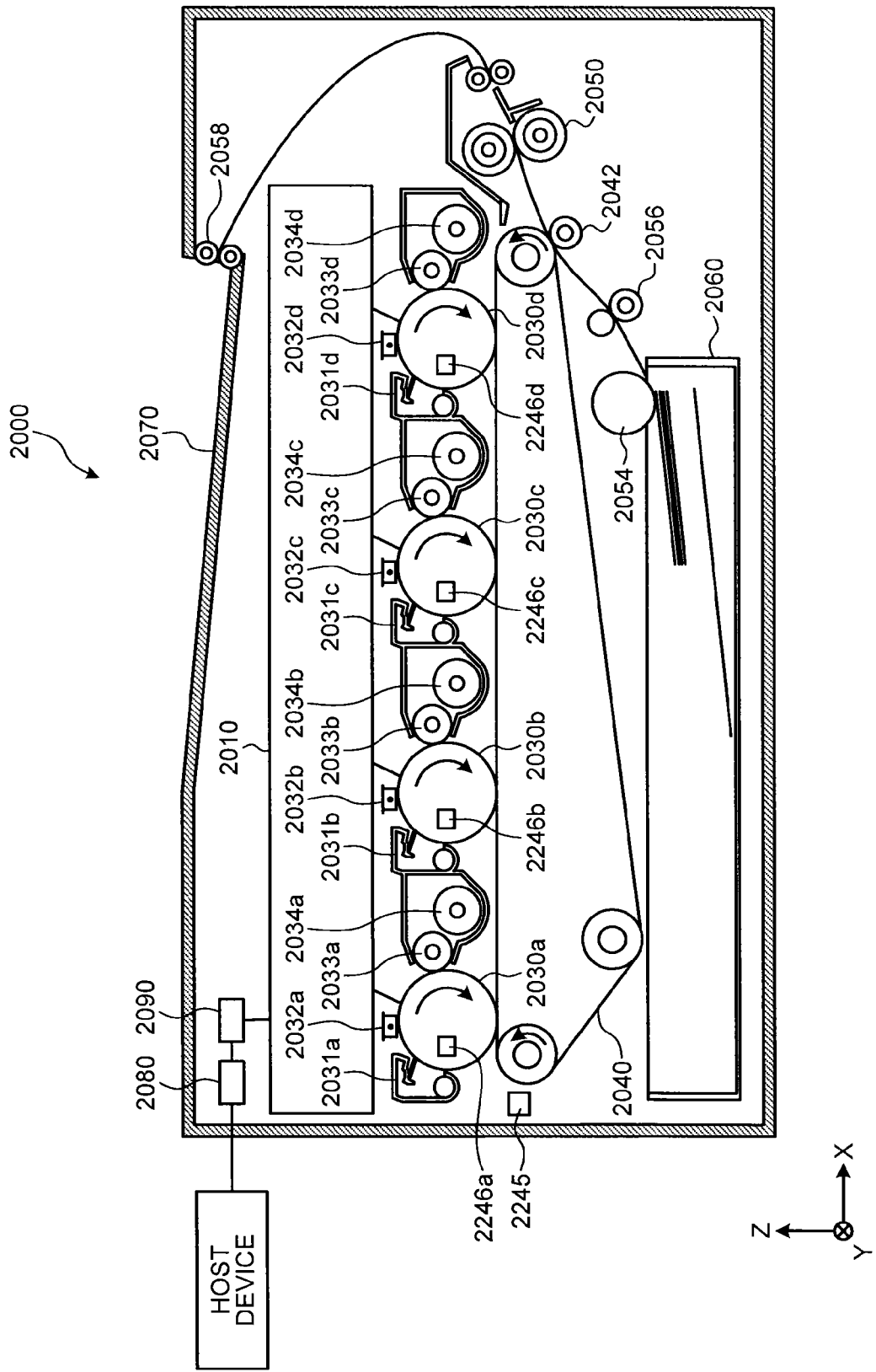
FIG. 1 illustrates a schematic configuration of a color printer 2000 according to an embodiment.

FIG. 1 illustrates a schematic configuration of a color printer 2000 according to the embodiment. The color printer 2000 transfers toner to a recording paper (object) to produce a printed material. The color printer 2000 is a multi-color printer employing the tandem system to produce full-color images by superimposing four colors (black, cyan, magenta, and yellow).

The color printer 2000 includes an optical scanning device 2010, four photoconductor drums 2030a, 2030b, 2030c, and 2030d (all four are collectively referred to as a photoconductor drum 2030), four cleaning units 2031a, 2031b, 2031c, and 2031d (all four are collectively referred to as a cleaning unit 2031), and four charging devices 2032a, 2032b, 2032c, and 2032d (all four are collectively referred to as a charging device 2032). The color printer 2000 further includes four developing rollers 2033a, 2033b, 2033c, and 2033d (all four are collectively referred to as a developing roller 2033), and four toner cartridges 2034a, 2034b, 2034c, and 2034d (all four are collectively referred to as a toner cartridge 2034). The color printer 2000 further includes a transfer belt 2040, a transfer roller 2042, a fixing roller 2050, a paper feeding roller 2054, a pair of registration rollers 2056, a paper ejection roller 2058, a paper feeding tray 2060, a paper ejection tray 2070, a communication controlling device 2080, density detecting unit 2245, four home position sensors 2246a, 2246b, 2246c, 2246d (all four are collectively referred to as a home position sensor 2246), and a printer controlling device 2090.

The communication controlling device 2080 controls interactive communication with a host device (for example, a computer) via a network.

The printer controlling device 2090 integrally controls these components included in the color printer 2000. The printer controlling device 2090 includes a central processing unit (CPU), ROM storing a program code executed in the CPU and various types of data used in the execution of the program, RAM which is a memory for an operation, and an AD conversion circuit which converts analog data into digital data. The printer controlling device 2090 controls the components instructed by the host device and transfers the image data transferred from the host device to the optical scanning device 2010.

The photoconductor drum 2030a, the charging device 2032a, the developing roller 2033a, the toner cartridge 2034a, and the cleaning unit 2031a are used as a set. These components constitute an image forming station for forming a black image (also referred to as K-station).

The photoconductor drum 2030b, the charging device 2032b, the developing roller 2033b, the toner cartridge 2034b, and the cleaning unit 2031b are used as a set. These components constitute an image forming station for forming a cyan image (also referred to as C-station).

The photoconductor drum 2030c, the charging device 2032c, the developing roller 2033c, the toner cartridge 2034c, and the cleaning unit 2031c are used as a set. These components constitute an image forming station for forming a magenta image (also referred to as M-station).

The photoconductor drum 2030d, the charging device 2032d, the developing roller 2033d, the toner cartridge 2034d, and the cleaning unit 2031d are used as a set. These components constitute an image forming station for forming a yellow image (also referred to as Y-station).

Each photoconductor drum 2030 is an example of a latent image bearer having a photoconductive layer on the surface. The surface of each photoconductor drum 2030 serves as a scan surface. The photoconductor drums 2030a, 2030b, 2030c, and 2030d are arrayed so as rotational axes thereof are parallel. For example, all the photoconductor drums rotate in the same direction (for example, in the direction shown in the arrows in FIG. 1).

Description will be made below using a three dimensional orthogonal coordinate system of X, Y, and Z, where Y-axis is the direction parallel to the central axis of the photoconductor drum 2030 and X-axis is the direction along which the photoconductor drum 2030 is arrayed.

Each charging device 2032 uniformly charges the surface of the corresponding photoconductor drum 2030. Each of the optical scanning device 2010 irradiates the charged surface of the corresponding photoconductor drum 2030 with the modulated light flux of each corresponding color based on the image data (black image data, cyan image data, magenta image data, and yellow image data). In this manner, only the portion of the surface of each photoconductor drum 2030 irradiated with the light loses the charge, and thus the latent image corresponding to the image data is formed on the surface of each photoconductor drum 2030. The latent image thus formed approaches the corresponding developing roller 2033 as the photoconductor drum 2030 rotates. The configuration of the optical scanning device 2010 will later be described in detail.

The region of the photoconductor drum 2030 where the image data is written is referred to as "effectively scanned region", "image formed region", or "effective image region."

The toner cartridge 2034a contains black toner. The black toner is supplied to the developing roller 2033a. The toner cartridge 2034b contains cyan toner. The cyan toner is supplied to the developing roller 2033b. The toner cartridge 2034c contains magenta toner. The magenta toner is supplied to the developing roller 2033c. The toner cartridge 2034d contains yellow toner. The yellow toner is supplied to the developing roller 2033d.

On the surface of each rotating developing roller 2033, the toner provided from the corresponding toner cartridge 2034 is uniformly applied in a thin layer. The toner on the surface of the developing roller 2033 contacts the surface of the corresponding photoconductor drum 2030 and is thereby transferred and adheres only to the portion of the surface of the photoconductor drum 2033 irradiated with the light. That is, the developing roller 2033 transfers the toner onto the latent image formed on the corresponding photoconductor drum 2030 to visualize the image.

The transfer belt 2040 is provided around the belt-rotation mechanism and travels in one direction. The outer surface of the transfer belt 2040 contacts the surface of each of photoconductor drums 2030a, 2030b, 2030c, and 2030d in the side opposite to the optical scanning device 2010. The outer side of the transfer belt 2040 contacts the transfer roller 2042.

An image formed with the toner adhering thereto (toner image) on the surface of the photoconductor drum 2030 approaches the transfer belt 2040 as the photoconductor drum 2030 rotates. Then each toner image of yellow, magenta, cyan, and black is sequentially transferred to the transfer belt 2040 at each predetermined timing to be superimposed to form a color image. The color image formed on the transfer belt 2040 approaches the transfer roller 2042 as the transfer belt 2040 travels.

Recording papers are stored in the paper feeding tray 2060. The paper feeding roller 2054 is disposed near the paper feeding tray 2060. The recording paper is picked out from the paper feeding tray 2060 one at a time by the paper feeding roller 2054 to be conveyed to a pair of registration rollers 2056.

A pair of registration rollers 2056 sends out the recording paper to the gap between the transfer belt 2040 and the transfer roller 2042 at a predetermined timing. The color image on the transfer belt 2040 is transferred to the recording paper. The recording paper with the transferred image is transferred to the fixing roller 2050.

The fixing roller 2050 applies heat and pressure to the recording paper. The toner is fixed on the recording paper by the fixing roller 2050. The recording paper with the fixed toner is transferred to the paper ejection tray 2070 via the paper ejection roller 2058 to be sequentially stacked on the paper ejection tray 2070.

Each cleaning unit 2031 removes the toner remaining on the surface (remaining toner) of the corresponding photoconductor drum 2030. The portion of the surface of the photoconductor drum 2030 from which the remaining toner is removed returns back to the previous position to oppose the corresponding charging device 2032.

Figure 2:
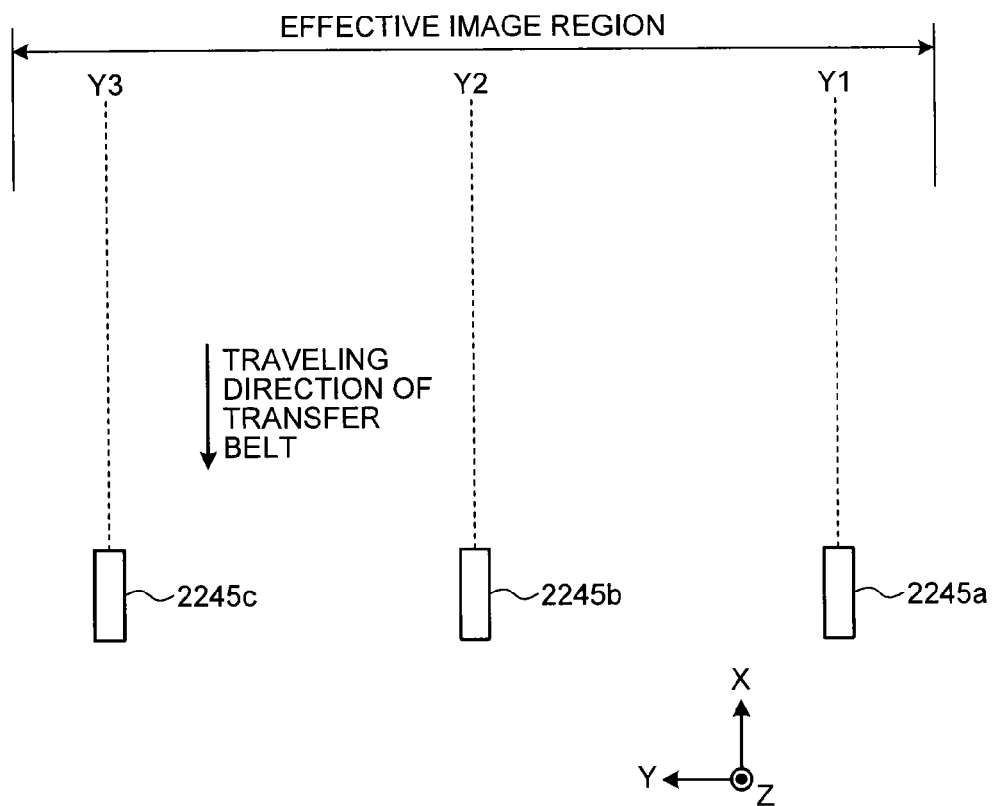
FIG. 2 illustrates an example arrangement of optical sensors 2245a, 2245b, and 2245c.

The density detecting unit 2245 is disposed in the minus-X side of the transfer belt 2040 (in the upstream of the fixing roller 2050 but in the downstream of four photoconductor drums 2030 along the traveling direction of the transfer belt 2040). The example density detecting unit 2245 includes three optical sensors 2245a, 2245b, and 2245c as illustrated in FIG. 2.

The optical sensor 2245a is disposed so as to oppose the section near an edge of the effective image region of the transfer belt 2040 in the minus-Y side (one of sides of the transfer belt 2040 along the width direction). The optical sensor 2245c is disposed so as to oppose the section near an edge of the effective image region of the transfer belt 2040 in the plus-Y side (the other side of the transfer belt 2040 along the width direction). The optical sensor 2245b is disposed substantially in the center between the optical sensor 2245a and the optical sensor 2245c along the main-scanning direction (in the middle of the transfer belt 2040 along the width direction). Along the main-scanning direction (Y direction), the center of the optical sensor 2245a is at Y1, the center of the optical sensor 2245b is at Y2, and the center of the optical sensor 2245c is at Y3.

Figure 3:
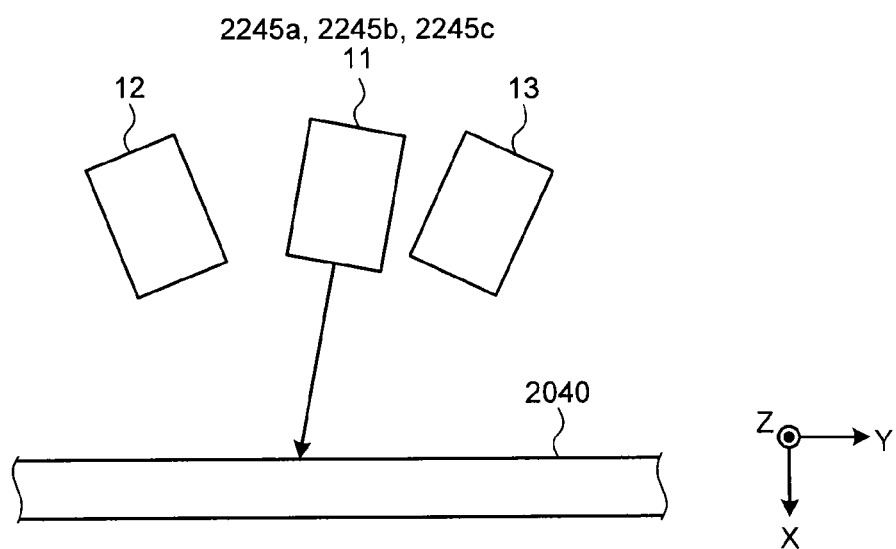
FIG. 3 illustrates an arrangement of optical sensors 2245a, 2245b, and 2245c.

As illustrated in FIG. 3, example optical sensors 2245a, 2245b, and 2245c each includes an LED 11 which emits light (hereinafter also referred to as detection light) toward the transfer belt 2040, a positive reflected light receiving element 12 which receives a positive reflected light from the transfer belt 2040 or a toner pad on the transfer belt 2040, and a diffused-reflected light receiving element 13 which receives a diffused-reflected light from the transfer belt 2040 or the toner pad on the transfer belt 2040. Each light receiving element outputs a signal corresponding to the amount of light received (photoelectric conversion signal).

The home position sensor 2246a detects the home position of the rotating photoconductor drum 2030a. The home position sensor 2246b detects the home position of rotation of the photoconductor drum 2030b. The home position sensor 2246c detects the home position of the rotating photoconductor drum 2030c. The home position sensor 2246d detects the home position of the rotating photoconductor drum 2030d.

Figure 4:
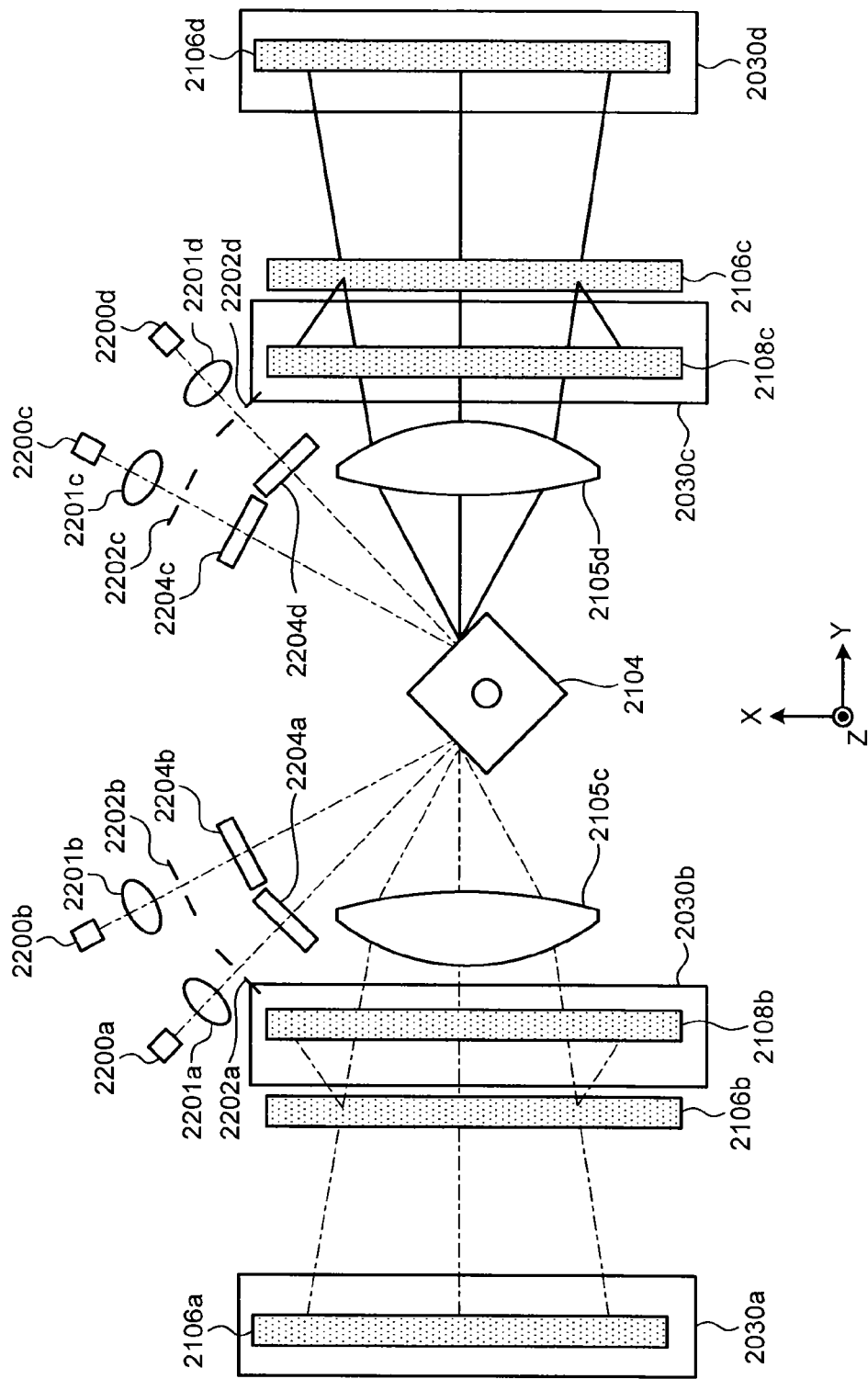
FIG. 4 illustrates a configuration of an optical system of an optical scanning device 2010.
Figure 5:
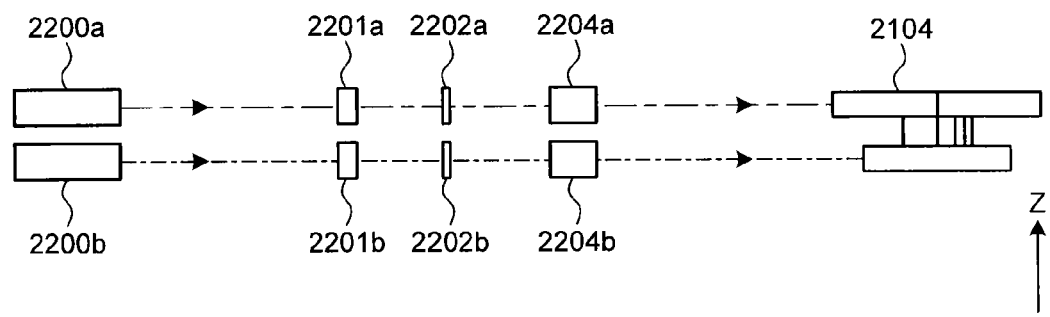
FIG. 5 illustrates an example of the optical path from a light source 2200a to a polygon mirror 2104 and the optical path from a light source 2200b to the polygon mirror 2104.
Figure 6:
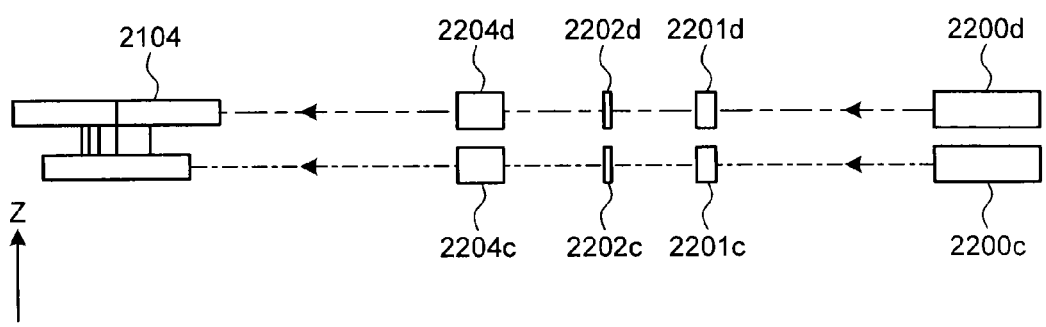
FIG. 6 illustrates an example of the optical path from a light source 2200c to a polygon mirror 2104 and the optical path from a light source 2200d to the polygon mirror 2104.
Figure 7:
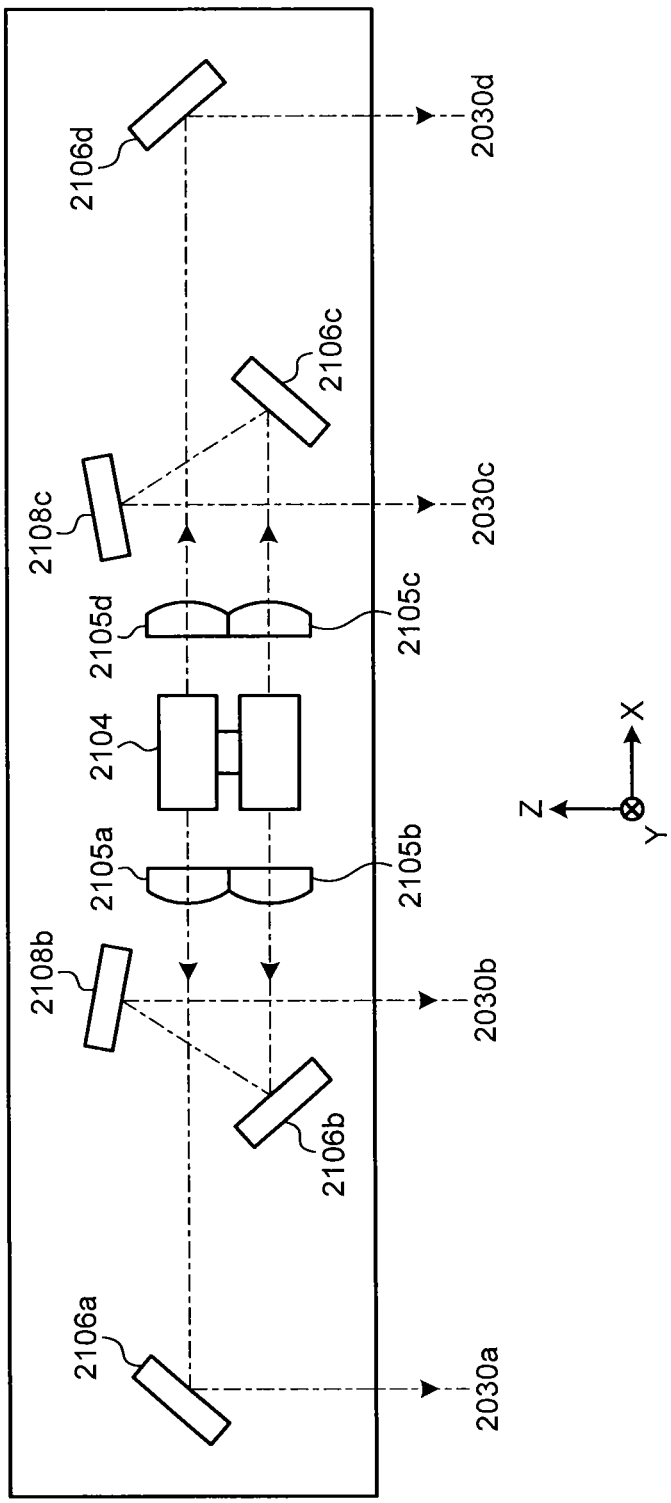
FIG. 7 illustrates an example of the optical path from the polygon mirror 2104 to each photoconductor drum 2030.

FIG. 4 illustrates a configuration of the optical system of the optical scanning device 2010. FIG. 5 illustrates an example optical path from the light source 2200a to the polygon mirror 2104 and an example optical path from a light source 2200b to the polygon mirror 2104. FIG. 6 illustrates an example optical path from the light source 2200c to the polygon mirror 2104 and an example optical path from a light source 2200d to the polygon mirror 2104. FIG. 7 illustrates an example optical path from the polygon mirror 2104 to each photoconductor drum 2030.

The configuration of the optical system of the optical scanning device 2010 will now be described. The optical scanning device 2010 includes four light sources 2200a, 2200b, 2200c, and 2200d, four coupling lenses 2201a, 2201b, 2201c, and 2201d, four aperture plates 2202a, 2202b, 2202c, and 2202d, and four cylindrical lenses 2204a, 2204b, 2204c, and 2204d to constitute the optical system. The optical scanning device 2010 further includes the polygon mirror 2104, four scanning lenses 2105a, 2105b, 2105c, and 2105d, and six return-mirrors 2106a, 2106b, 2106c, 2106*d*, 2108*b*, and 2108*c* to constitute the optical system. These are each assembled at a predetermined position in the optical housing.

The optical scanning device 2010 includes an electric system which will be described referring to FIG. 8 and the subsequent drawings.

Each of the light sources 2200*a*, 2200*b*, 2200*c*, and 2200*d* includes a surface-emitting laser array configured with a plurality of two-dimensionally arrayed light-emitters. A plurality of light-emitters of the surface-emitting laser array is arranged so as the distance between adjacent light-emitters orthogonally projected on an imaginary line extending along the direction corresponding to the sub-scanning direction is constant among all the light-emitters. Each of the example light sources 2200*a*, 2200*b*, 2200*c*, and 2200*d* is a vertical cavity surface emitting laser (VCSEL).

The coupling lens 2201*a* is disposed on the optical path of the light flux emitted from the light source 2200*a*. The light flux passes through the coupling lens 2201*a* to become a substantially parallel light flux. The coupling lens 2201*b* is disposed on the optical path of the light flux emitted from the light source 2200*b*. The light flux passes through the coupling lens 2201*b* to become a substantially parallel light flux. The coupling lens 2201*c* is disposed on the optical path of the light flux emitted from the light source 2200*c*. The light flux passes through the coupling lens 2201*c* to become a substantially parallel light flux. The coupling lens 2201*d* is disposed on the optical path of the light flux emitted from the light source 2200*d*. The light flux passes through the coupling lens 2201*d* to become a substantially parallel light flux.

The aperture plate 2202*a* includes an aperture to trim the light flux coming from the coupling lens 2201*a*. The aperture plate 2202*b* includes an aperture to trim the light flux coming from the coupling lens 2201*b*. The aperture plate 2202*c* includes an aperture to trim the light flux coming from the coupling lens 2201*c*. The aperture plate 2202*d* includes an aperture to trim the light flux coming from the coupling lens 2201*d*.

The cylindrical lens 2204*a* forms an image in the vicinity of the deflection/reflection surface of the polygon mirror 2104 along the Z direction from the light flux passing through the aperture of the aperture plate 2202*a*. The cylindrical lens 2204*b* forms an image in the vicinity of the deflection/reflection surface of the polygon mirror 2104 along the Z direction from the light flux passing through the aperture of the aperture plate 2202*b*. The cylindrical lens 2204*c* forms an image in the vicinity of the deflection/reflection surface of the polygon mirror 2104 along the Z direction from the light flux passing through the aperture of the aperture plate 2202*c*. The cylindrical lens 2204*d* forms an image in the vicinity of the deflection/reflection surface of the polygon mirror 2104 along the Z direction from the light flux passing through the aperture of the aperture plate 2202*d*.

The optical system configured with the coupling lens 2201*a*, the aperture plate 2202*a*, and the cylindrical lens 2204*a* is a pre-deflector optical system of the K-station. The optical system configured with the coupling lens 2201*b*, the aperture plate 2202*b*, and the cylindrical lens 2204*b* is a pre-deflector optical system of the C-station. The optical system configured with the coupling lens 2201*c*, the aperture plate 2202*c*, and the cylindrical lens 2204*c* is a pre-deflector optical system of the M-station. The optical system configured with the coupling lens 2201*d*, the aperture plate 2202*d*, and the cylindrical lens 2204*d* is an optical system introducing the light to the deflecting unit of the Y-station.

The polygon mirror 2104 includes two stages of four-side-mirrors that rotates about the axis parallel to the Z axis. Each mirror of the four-side-mirror serves as a deflection/reflection surface. The light flux from the cylindrical lens 2204*b* and the light flux from the cylindrical lens 2204*c* are deflected by the four-side-mirror in the first stage (lower stage), and the light flux from the cylindrical lens 2204*a* and the light flux from the cylindrical lens 2204*d* are deflected by the four-side-mirror in the second stage (upper stage).

The light flux from the cylindrical lens 2204*a* and the light flux from the cylindrical lens 2204*b* are deflected to the minus-X side of the polygon mirror 2104, and the light flux from the cylindrical lens 2204*c* and the light flux from the cylindrical lens 2204*d* are deflected to the plus-X side of the polygon mirror 2104.

Each of the scanning lenses 2105*a*, 2105*b*, 2105*c*, and 2105*d* has the optical power of focusing the light flux on a point near the corresponding photoconductor drum 2030 and the optical power of moving an optical spot, by the rotation of the polygon mirror 2104, along the main-scanning direction at a constant speed on the surface of the corresponding photoconductor drum 2030.

The scanning lens 2105*a* and the scanning lens 2105*b* are disposed in the minus-X side of the polygon mirror 2104. The scanning lens 2105*c* and the scanning lens 2105*d* are disposed in the plus-X side of the polygon mirror 2104.

The scanning lens 2105*a* and the scanning lens 2105*b* are stacked along the Z axis direction. The scanning lens 2105*b* opposes the four-side-mirror in the first stage. The scanning lens 2105*a* opposes the four-side-mirror in the second stage.

The scanning lens 2105*c* and the scanning lens 2105*d* are stacked along the Z axis direction. The scanning lens 2105*c* opposes the four-side-mirror in the first stage. The scanning lens 2105*d* opposes the four-side-mirror the second stage.

The light flux from the cylindrical lens 2204*a* is deflected by the polygon mirror 2104 and emitted on the photoconductor drum 2030*a* via the scanning lens 2105*a* and the return-mirror 2106*a* to form an optical spot. The optical spot moves along the longitudinal direction of the photoconductor drum 2030*a* by the rotation of the polygon mirror 2104. That is, the photoconductor drum 2030*a* is scanned by the optical spot. The moving direction of the optical spot is the "main-scanning direction" of the photoconductor drum 2030*a*, and the rotational direction of the photoconductor drum 2030*a* is the "sub-scanning direction" of the photoconductor drum 2030*a*.

The light flux from the cylindrical lens 2204*b* is deflected by the polygon mirror 2104 and emitted on the photoconductor drum 2030*b* via the scanning lens 2105*b*, the return-mirror 2106*b*, and the return-mirror 2108*b* to form an optical spot. The optical spot moves along the longitudinal direction of the photoconductor drum 2030*b* by the rotation of the polygon mirror 2104. That is, the photoconductor drum 2030*b* is scanned by the optical spot. The moving direction of the optical spot is the "main-scanning direction" of the photoconductor drum 2030*b*, and the rotational direction of the photoconductor drum 2030*b* is the "sub-scanning direction" of the photoconductor drum 2030*b*.

The light flux from the cylindrical lens 2204*c* is deflected by the polygon mirror 2104 and emitted on the photoconductor drum 2030*c* via the scanning lens 2105*c*, the return-mirror 2106*c*, and the return-mirror 2108*c* to form an optical spot. The optical spot moves along the longitudinal direction of the photoconductor drum 2030*c* by the rotation of the polygon mirror 2104. That is, the photoconductor drum 2030*c* is scanned by the optical spot. The moving direction of the optical spot is the "main-scanning direction" of the photoconductor drum 2030c, and the rotational direction of the photoconductor drum 2030c is the "sub-scanning direction" of the photoconductor drum 2030c.

The light flux from the cylindrical lens 2204d is deflected by the polygon mirror 2104 and emitted on the photoconductor drum 2030d via the scanning lens 2105d and the return-mirror 2106d to form an optical spot. The optical spot moves along the longitudinal direction of the photoconductor drum 2030d by the rotation of the polygon mirror 2104. That is, the photoconductor drum 2030d is scanned by the optical spot. The moving direction of the optical spot is the "main-scanning direction" of the photoconductor drum 2030d, and the rotational direction of the photoconductor drum 2030d is the "sub-scanning direction" of the photoconductor drum 2030d.

Each of the return-mirrors 2106a, 2106b, 2106c, 2106d, 2108b, and 2108c is disposed in such a manner that the length of the optical path from the polygon mirror 2104 to the corresponding photoconductor drum 2030, the location of incidence of the light flux on the corresponding photoconductor drum 2030, and the incidence angle of the light flux to the photoconductor drum 2030 are each identical among all the return-mirrors.

The optical system disposed on the optical path between the polygon mirror 2104 and each photoconductor drum 2030 is also referred to as a scanning optical system. The scanning lens 2105a and the return-mirror 2106a constitute the scanning optical system of the K-station. The scanning lens 2105b and two return-mirrors 2106b and 2108b constitute the scanning optical system of the C-station. The scanning lens 2105c and two return-mirrors 2106c and 2108c constitute the scanning optical system of the M-station. The scanning lens 2105d and the return-mirror 2106d constitute the scanning optical system of the Y-station. In any of the scanning optical systems, the scanning lens 2105 may be composed of a plurality of lenses.

Figure 8:
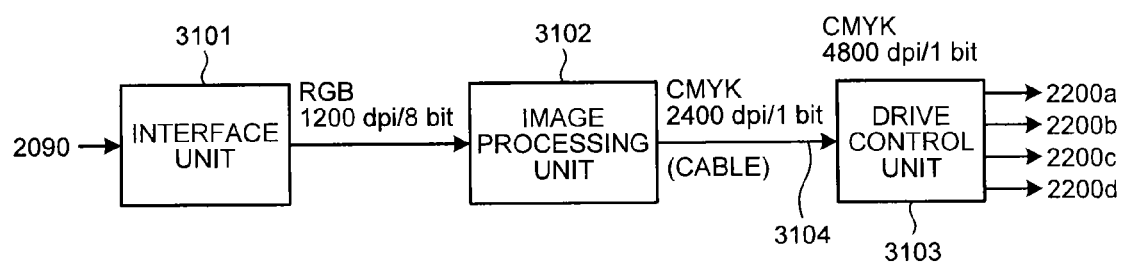
FIG. 8 illustrates a configuration of an electric system of the optical scanning device 2010.

FIG. 8 illustrates a configuration of an electric system of the optical scanning device 2010. The optical scanning device 2010 includes an interface unit 3101, an image processing unit 3102, and a drive control unit 3103 which constitute the electric system.

The interface unit 3101 acquires the image data transferred from a host device (for example, a computer) via the printer controlling device 2090. The interface unit 3101 transfers the acquired image data to the image processing unit 3102 in the downstream stage.

In the exemplary embodiment, the interface unit 3101 acquires an RGB-type image data with the resolution of 1200 dpi and the bit number of 8, which is then transferred to the image processing unit 3102.

The image processing unit 3102 serves as an image processing unit. The image processing unit 3102 acquires image data from the interface unit 3101 and then converts the image data into color image data in accordance with the printing method. For example, the image processing unit 3102 converts the RGB-type image data into image data in accordance with the tandem system (CMYK system). The image processing unit 3102 performs various types of image processing in addition to converting the type of data.

In the exemplary embodiment, the image processing unit 3102 outputs CMYK image data with the resolution of 2400 dpi and the bit number of 1. The resolution of the image data output from the image processing unit 3102 is referred to as the first resolution.

The image processing unit 3102 also generates tag information assigned to each pixel of the image data with the first resolution (2400 dpi). The tag information indicates whether the pixel is in an edge of a letter or a line. The image processing unit 3102 transfers the generated tag information to the drive control unit 3103.

The drive control unit 3103 acquires image data with the first resolution from the image processing unit 3102 and then converts the image data into color image data with the second resolution, which is used for driving the light source. The second resolution is higher than the first resolution. In the exemplary embodiment, the drive control unit 3103 converts the image data into CMYK image data with the resolution of 4800 dpi and the bit number of 1.

The drive control unit 3103 selects the detail of the resolution-conversion processing of each pixel based on whether the pixel is in the target region including an edge of a letter or a line. Specifically, the drive control unit 3103 identifies the target region including an edge of a letter or a line among image data with the first resolution based on tag information and luminance data. The drive control unit 3103 then converts the target region into a pixel pattern with the second resolution through the image processing and the pixel not included in the target region into a pixel pattern corresponding to the density of the pixel. The drive control unit 3103 performs such conversion to generate the image data with the second resolution from the image data with the first resolution.

The drive control unit 3103 modulates the generated image data with the second resolution with a clock signal indicating a timing of the pixel emitting light to generate an independent modulation signal (light source modulation signal) for each color. The drive control unit 3103 then instructs the light sources 2200a, 2200b, 2200c, and 2200d to emit light in accordance with each modulation signal corresponding to each color. The drive control unit 3103 may perform the resolution-conversion processing and the modulating processing integrally.

An example drive control unit 3103 is a single-chip integrated device provided in the vicinity of the light sources 2200a, 2200b, 2200c, and 2200d. The image processing unit 3102 and the interface unit 3101 are disposed remote from the light sources 2200a, 2200b, 2200c, and 2200d compared to the drive control unit 3103. The image processing unit 3102 and the drive control unit 3103 are connected via a cable 3104.

With the optical scanning device 2010 thus configured, a latent image can be produced by the light emitted from the light sources 2200a, 2200b, 2200c, and 2200d, where the light represents the image data.

Figure 9:
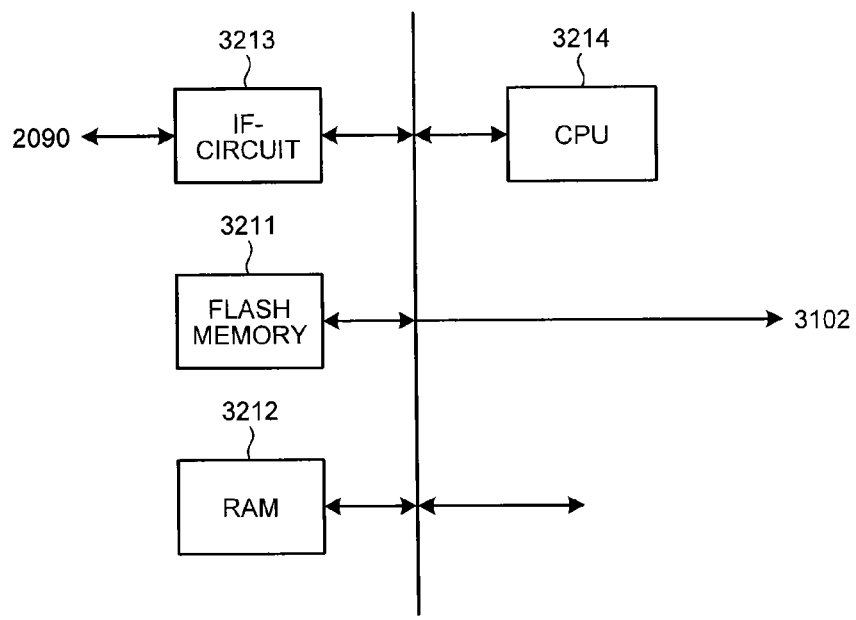
FIG. 9 illustrates a configuration of an interface unit 3101.

FIG. 9 illustrates a configuration of the interface unit 3101. The example interface unit 3101 includes a flash memory 3211, RAM 3212, an IF-circuit 3213, and a CPU 3214. The flash memory 3211, the RAM 3212, the IF-circuit 3213, and the CPU 3214 are connected via a bus.

The flash memory 3211 stores a program executed in the CPU 3214 and various types of data necessary for execution of the program in the CPU 3214. The RAM 3212 serves as a memory region providing a work area for executing the program in the CPU 3214. The IF-circuit 3213 performs interactive communication with the printer controlling device 2090.

Instructed by the program stored in the flash memory 3211, the CPU 3214 operates to totally control the optical scanning device 2010. The interface unit 3101 thus configured transfers the input image data (RGB-type, 1200 dpi, 8-bit) transmitted from the printer controlling device 2090 to the image processing unit 3102.

Figure 10:
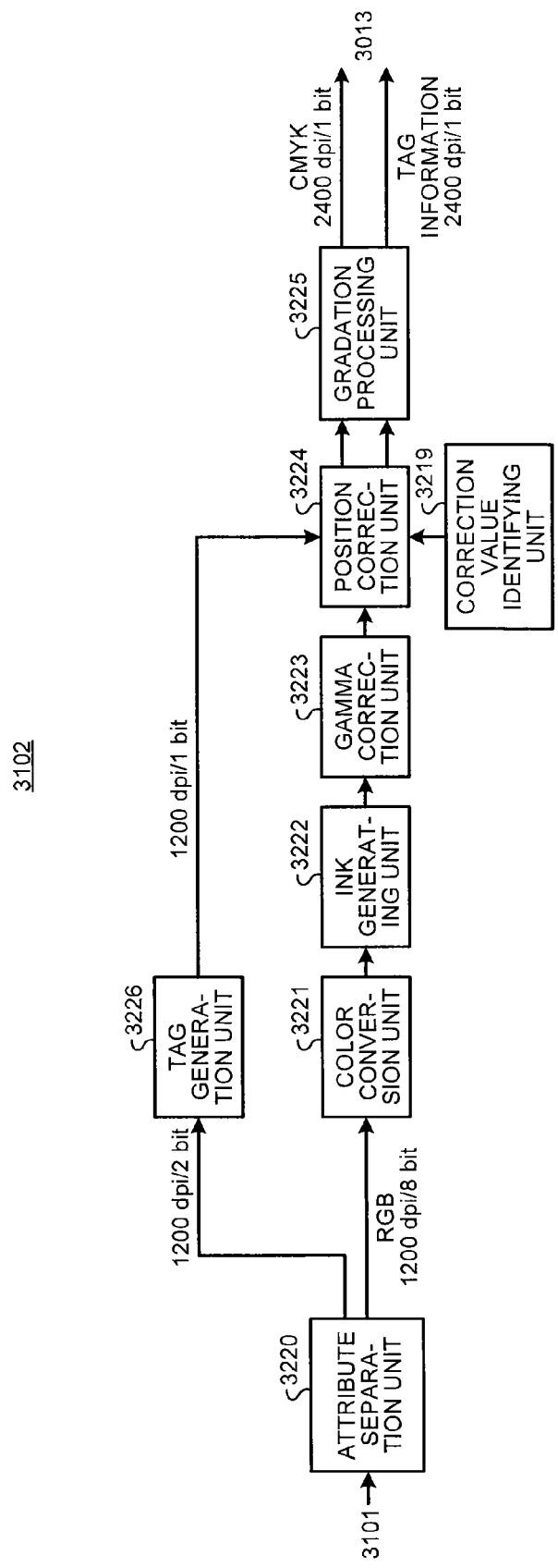
FIG. 10 illustrates a configuration of an image processing unit 3102.

FIG. 10 illustrates a configuration of the image processing unit 3102. The image processing unit 3102 includes a correction value identifying unit 3219, an attribute separation unit 3220, a color conversion unit 3221, an ink generating unit 3222, a gamma correction unit 3223, a position correction unit 3224, a gradation processing unit 3225, and a tag generation unit 3226.

The correction value identifying unit 3219 identifies a correction value for correcting a registration error of the image to be formed. Specifically, for two-sided printing, the correction value identifying unit 3219 identifies an amount of rotation, an amount of scaling, and an amount of shift as correction values to perform registration between the front and back sides. Such correction value may previously be stored in the correction value identifying unit 3219 before shipping from a factory, or the correction value may be generated by calibration. Alternatively, a user may input the correction value in the correction value identifying unit 3219.

The attribute separation unit 3220 receives an input image data (RGB-type, 1200 dpi, 8-bit) from the interface unit 3101. Each pixel of the input image data is appended with attribute information. The attribute information indicates the type of an object which is the source of the region (pixel). For example, if a pixel is a portion of a letter, the attribute information represents the attribute indicating a "letter". For example, if a pixel is a portion of a line, the attribute information represents the attribute indicating a "line". For example, if a pixel is a portion of a figure, the attribute information represents the attribute indicating a "figure". For example, if a pixel is a portion of a photograph, the attribute information represents the attribute indicating a "photograph".

The attribute separation unit 3220 separates attribute information and image data from input image data. The attribute separation unit 3220 transfers the separated attribute information and image data to the tag generation unit 3226. The attribute separation unit 3220 also transfers the image data to the color conversion unit 3221. Example image data output from the attribute separation unit 3220 is RGB-type image data of 1200 dpi and 8-bit. Example attribute data output from the attribute separation unit 3220 has the same resolution as the image data (1200 dpi) and the number of bit of 2.

The color conversion unit 3221 converts RGB-type image data of 8-bit into CMY-type image data of 8-bit. The ink generating unit 3222 generates a black component and CMYK-type image data from CMY-type image data generated in the color conversion unit 3221. The gamma correction unit 3223 performs linear conversion of each color of the CMYK-type image data generated in the ink generating unit 3222 by using tables.

The position correction unit 3224 receives image data from the gamma correction unit 3223 and removes noise and distortion therefrom. In a case of two-sided printing, the position correction unit 3224 also serves as a deformation processing unit which performs deformation processing of the image data to perform registration between the front and back sides. Specifically, for two-sided printing, the position correction unit 3224 performs position correction of the image by rotating, scaling, and shifting the image based on the correction value identified by the correction value identifying unit 3219. In the process, the position correction unit 3224 converts the resolution of 1200 dpi into the resolution of 2400 dpi. The position correction unit 3224 then outputs CMYK-type image data of 2400 dpi (the first resolution) and multi-bit (8-bit in the exemplary embodiment).

The gradation processing unit 3225 receives CMYK-type image data of 2400 dpi and 8-bit from the position correction unit 3224. The gradation processing unit 3225 reduces the gradation of the received image data of 8-bit and outputs the image data of 1-bit. For example, the gradation processing unit 3225 performs pseudo halftone processing, such as dithering and error diffusion processing, to reduce the gradation of the image data from 8-bit to 1-bit. The gradation processing unit 3225 then transmits the image data with the first resolution (2400 dpi) of 1-bit to the drive control unit 3103.

The tag generation unit 3226 generates tag information for each pixel of the image data with the resolution of 1200 dpi. The tag information indicates whether the pixel is in an edge of a letter or a line. For example, the tag generation unit 3226 generates tag information based on attribute information and the pixel value of the image data.

Specifically, the tag generation unit 3226 assigns the tag information indicating an edge of a letter or a line to a pixel which has attribute information indicating a letter or a line and is located in the boundary of a letter or a line. For example, the tag generation unit 3226 assigns the tag information indicating an edge of a letter or a line to a black pixel which has attribute information indicating a letter or a line and has luminance higher or lower than the luminance of either of adjacent pixels by a certain threshold or more.

The tag information generated in the tag generation unit 3226 is transferred to the drive control unit 3103 via the position correction unit 3224 and the gradation processing unit 3225. The position correction unit 3224 applies the processing of increasing the resolution of the image data from 1200 dpi to 2400 dpi and the same processing as the position correction of the image data to the tag information. As a result, the position correction unit 3224 increases the resolution of the tag information from 1200 dpi to 2400 dpi and assigns the tag information to each resulting high resolution pixel.

In this manner, the image processing unit 3102 generates tag information assigned to each pixel of the image data with the first resolution (2400 dpi) and can transmit the resulting tag information to the drive control unit 3103.

A portion of or the whole of the image processing unit 3102 may be realized by hardware or by the CPU executing a software program.

Figure 11:
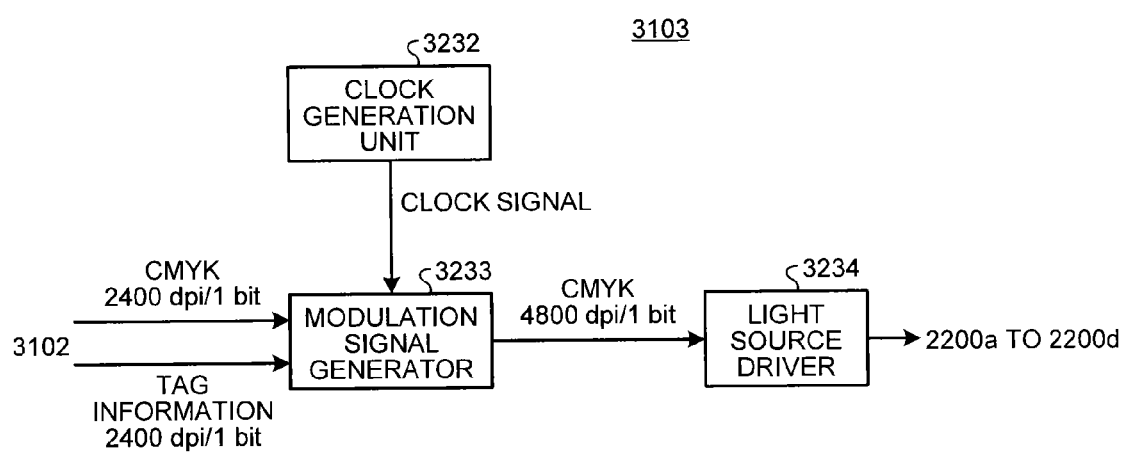
FIG. 11 illustrates a configuration of a drive control unit 3103.

FIG. 11 illustrates a configuration of the drive control unit 3103. The drive control unit 3103 includes a clock generation unit 3232, a modulation signal generation unit 3233, and a light source drive unit 3234.

The clock generation unit 3232 generates a clock signal indicating the timing of the pixel emitting light. The clock signal is a signal with which the modulation of the image data corresponding to the resolution of 4800 dpi can be performed.

The modulation signal generation unit 3233 acquires image data with the first resolution from the image processing unit 3102. The modulation signal generation unit 3233 then generates image data with the second resolution, which is higher than the first resolution, from the image data with the first resolution. In the exemplary embodiment, the modulation signal generation unit 3233 generates CMYK-type image data of 4800 dpi and 1-bit based on CMYK-type image data of 2400 dpi and 1-bit. The modulation signal generation unit 3233 then modulates the clock signal with the image data with the second resolution to generate a modulation signal for generating an image of 4800 dpi.

The modulation signal generation unit 3233 then acquires tag information from the image processing unit 3102. The modulation signal generation unit 3233 selects the detail of the resolution-conversion processing for each pixel based on the detail of the tag information.

The light source drive unit 3234 receives a modulation signal in accordance with the image data with the second resolution. Based on each independent modulation signal for each color output from the modulation signal generation unit 3233, the light source drive unit 3234 drives corresponding light sources, that is, 2200a, 2200b, 2200c, and 2200d. The light source drive unit 3234 drives each of the light sources 2200a, 2200b, 2200c, and 2200d to emit light according to each corresponding modulation signal.

Figure 12:
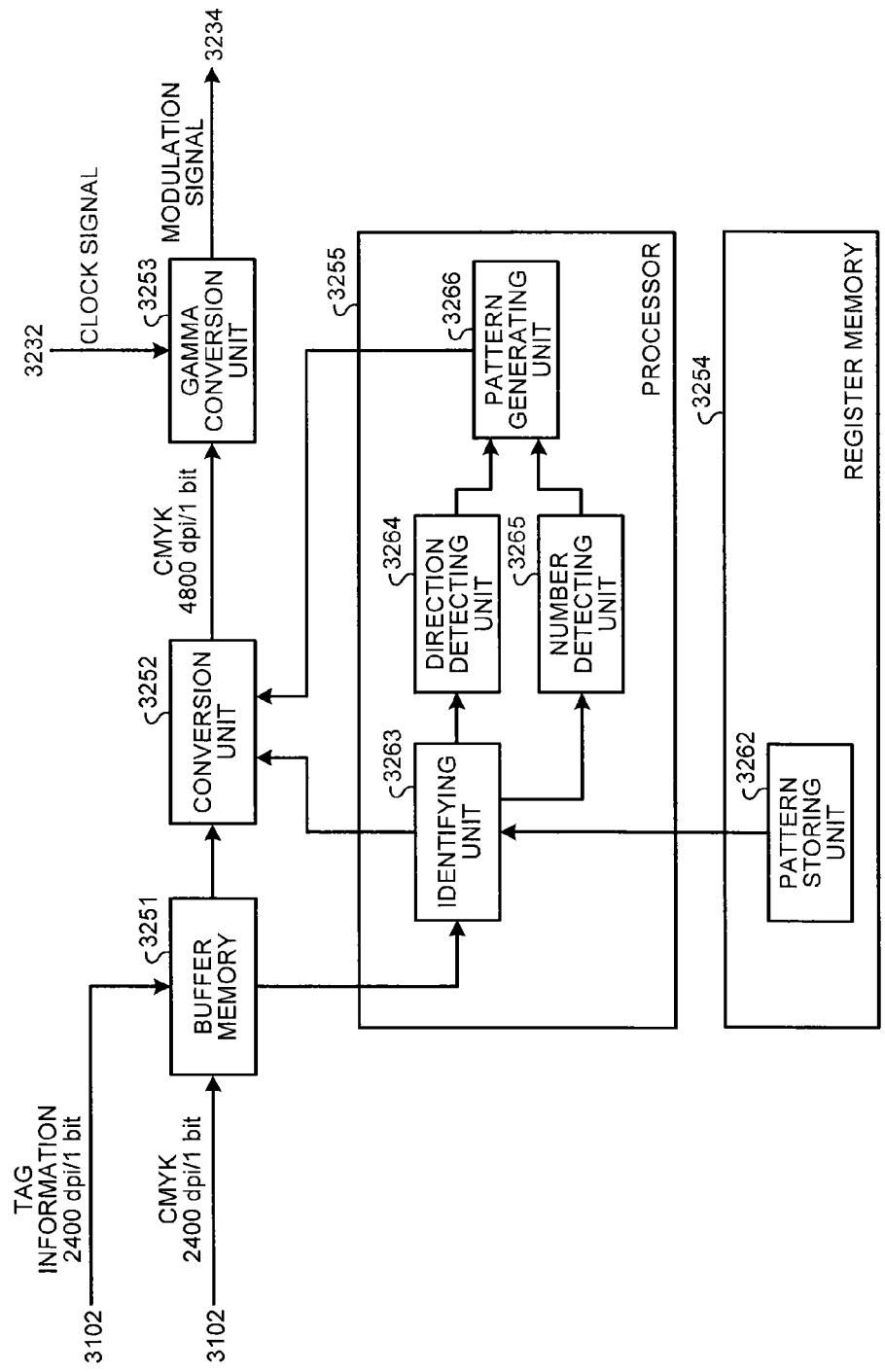
FIG. 12 illustrates a configuration of a modulation signal generation unit 3233.

FIG. 12 illustrates a configuration of the modulation signal generation unit 3233. The modulation signal generation unit 3233 includes a buffer memory 3251, a conversion unit 3252, a gamma conversion unit 3253, a register memory 3254, and a processor 3255.

The buffer memory 3251 stores the image data with the first resolution (2400 dpi, 1-bit) and the tag information with the first resolution (2400 dpi, 1-bit) which are transmitted from the image processing unit 3102. The buffer memory 3251 stores image data by each main scanning line and transmits the stored data to the downstream circuit in response to the readout in the downstream circuit.

The conversion unit 3252 converts the image data with the first resolution into the image data with the second resolution, which is higher than the first resolution. In the embodiment, the conversion unit 3252 converts pixels of 2400 dpi and 1-bit into image data of 4800 dpi and 1-bit by dividing each pixel into two along the main-scanning direction and the sub-scanning direction.

Before converting the resolution of the target pixel, the conversion unit 3252 receives the information indicating whether the target pixel is included in the target region from the processor 3255. If the target pixel is included in the target region, the conversion unit 3252 receives a pixel pattern with the second resolution having a shape and size corresponding to the target region from the processor 3255. The target region is composed of a plurality of pixels, has a certain shape (for example, a rectangular shape), and includes an edge of a letter or a line.

If the target pixel is included in the target region, the conversion unit 3252 converts the resolution by replacing the target pixel with a plurality of pixels in the corresponding region in the received pixel pattern.

When the target pixel is not included in the target region, the conversion unit 3252 replaces the target pixel with a plurality of pixels with a pixel value corresponding to the density of the target pixel. For example, when converting image data of 2400 dpi and 1-bit into image data of 4800 dpi and 1-bit, the conversion unit 3252 replaces the target pixel having a pixel value of 1 with four pixels each having a pixel value of 1. The conversion unit 3252 also replaces the target pixel having a pixel value of 0 with four pixels each having a pixel value of 0. The conversion unit 3252 transfers the converted image data with the second resolution to the gamma conversion unit 3253.

The gamma conversion unit 3253 performs modulation of the received image data with the second resolution according to the clock signal and performs level conversion according to the property of the light source 2200 to generate a modulation signal. The gamma conversion unit 3253 transmits the generated modulation signal to the light source drive unit 3234.

The register memory 3254 includes a pattern storing unit 3262. The pattern storing unit 3262 stores conditions or patterns for identifying the target region in image data with the first resolution.

The processor 3255 includes an identifying unit 3263, a direction detecting unit 3264, a number detecting unit 3265, and a pattern generating unit 3266.

The identifying unit 3263 identifies the target region in image data with the first resolution based on tag information with the first resolution and the density of each pixel in the image data with the first resolution. For example, the identifying unit 3263 identifies a region which has a predetermined shape and includes at least a predetermined number of black pixel or pixels assigned with tag information indicating an edge and a predetermined number of white pixel or pixels in the image data with the first resolution as the target region. An example identifying unit 3263 may compare image data with the first resolution with a previously stored pattern and identify a region identical to the pattern as the target region. The identifying unit 3263 then informs the conversion unit 3252 of the information on the decision whether the target pixel to be converted by the conversion unit 3252 is included in the target region.

The direction detecting unit 3264 detects the direction of the edge of the target region, that is, the direction along the boundary between the white region and the black region. The direction detecting unit 3264 detects the direction toward the black region from the edge. The number detecting unit 3265 detects the number of black pixel or pixels with the first resolution in the target region.

The pattern generating unit 3266 generates the pixel pattern with the second resolution based on the direction of the edge and the direction toward the high region from the edge, which are detected by the direction detecting unit 3264, and the number of black pixels detected by the number detecting unit 3265.

For example, the pattern generating unit 3266 generates a pixel pattern with the second resolution in which black pixels are disposed closer to the black region from the edge in the region having a predetermined shape and the edge between the white region and the black region is smoothened in the direction along the direction of the edge. In this case the pattern generating unit 3266 generates, for example, a pixel pattern including black pixels with the second resolution by the number in accordance with the number of black pixels with the first resolution. The pattern generating unit 3266 then transfers the generated pixel pattern to the conversion unit 3252.

The conversion unit 3252 converts the target region in the image data with the first resolution into the pixel pattern generated by the pattern generating unit 3266. Specifically, the conversion unit 3252 acquires from the identifying unit 3263 the information on the decision whether the target pixel to be subject to resolution conversion is included in the target region. When the target pixel is included in the target region, the conversion unit 3252 replaces the target pixel with a group of pixels in the region corresponding to the pixel pattern generated by the pattern generating unit 3266. In this manner, the conversion unit 3252 converts the target region including an edge of a letter or a line in the image data with the first resolution into the pixel pattern with the second resolution having a smoothened edge.

The processor 3255 is a data processing device, such as a CPU. When a program previously written in ROM, for example, is executed, the processor 3255 functions as the identifying unit 3263 and the pattern generating unit 3266.

Specific Processing in Each Component

Processing in each component will specifically be described referring to specific image data.

Figure 13:
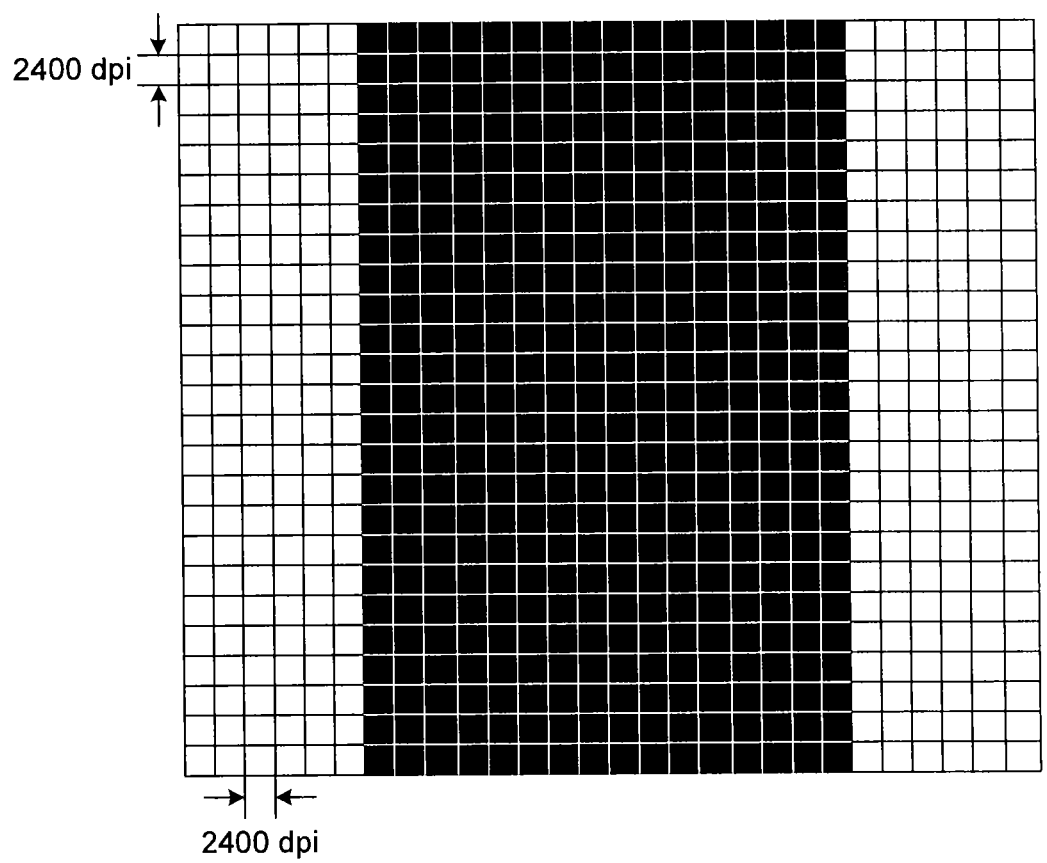
FIG. 13 illustrates an example of a line drawing of 2400 dpi.
Figure 14:
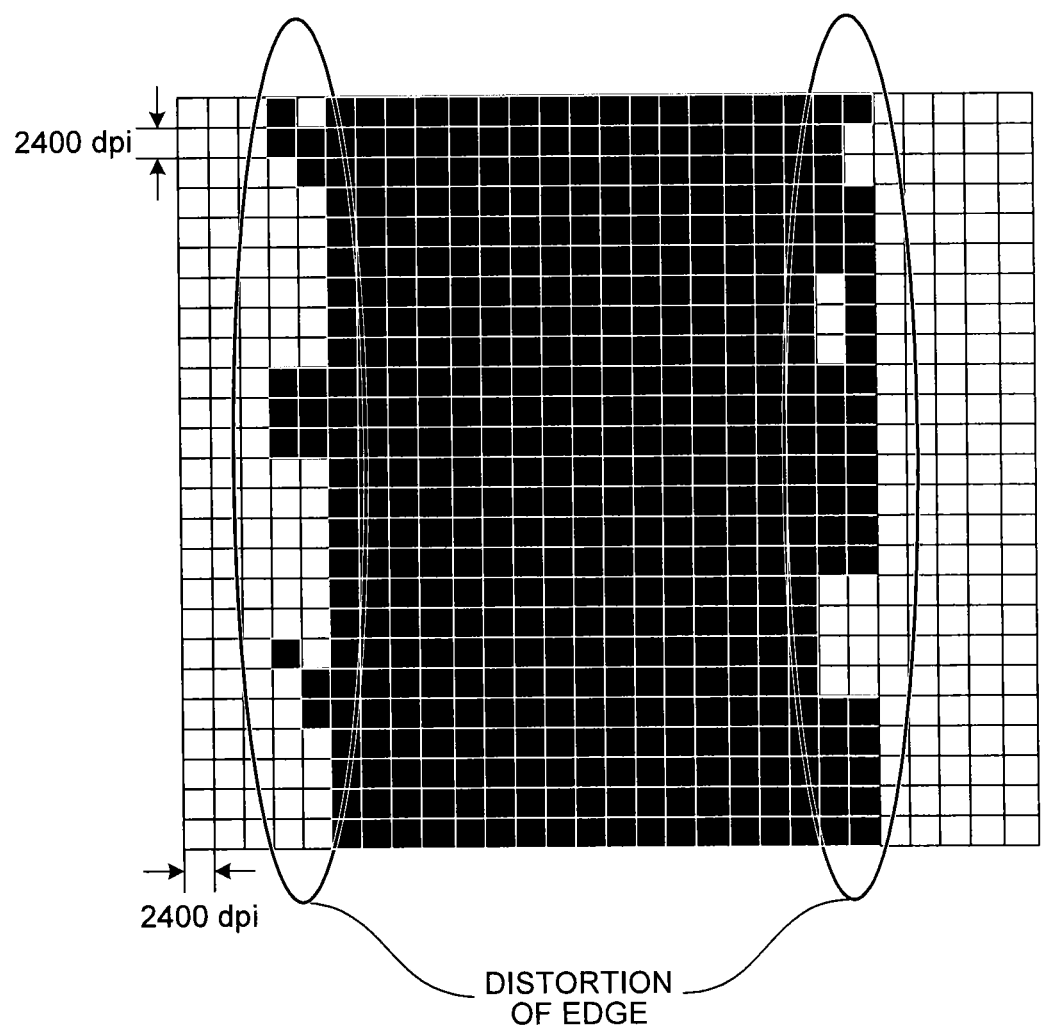
FIG. 14 illustrates an example of a line drawing of 2400 dpi after position correction is applied thereto.

FIG. 13 illustrates an example of a line drawing of 2400 dpi. FIG. 14 illustrates an example of a line drawing of 2400 dpi after position correction.

In a case of two-sided printing, the position correction unit 3224 performs position correction of an image by rotating, scaling, or shifting the image to perform registration between the front and back sides. When the position correction unit 3224 performs no position correction of the image, the edge of the line drawing (a letter or a line is also referred to as a line drawing) is not distorted as illustrated in FIG. 13. In contrast, when the position correction unit 3224 performs position correction of an image, the edge of the line drawing may be distorted as illustrated in FIG. 14.

Figure 15:
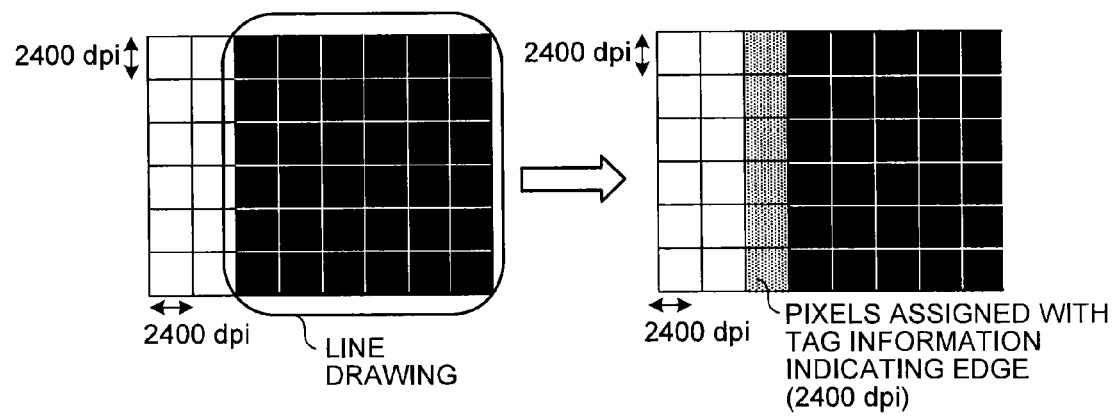
FIG. 15 illustrates an example of pixels to which the tag information indicating an edge is assigned.

FIG. 15 illustrates an example of pixels to which tag information indicating an edge is assigned. The tag generation unit 3226 assigns the tag information indicating an edge to a pixel which has attribute information indicating a line drawing and is located in the boundary portion of a line drawing.

An example tag generation unit 3226 assigns the tag information indicating an edge to the black pixel (for example, a pixel with a pixel value of 255) which has attribute information indicating a line drawing and has luminance higher or lower than the luminance of either of adjacent pixels by a certain threshold or more as illustrated in FIG. 15.

Figure 16:
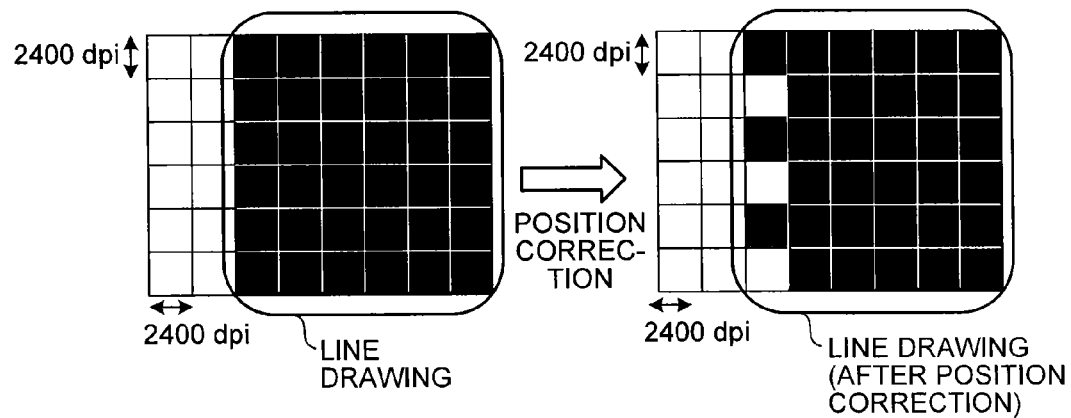
FIG. 16 illustrates an example of an edge portion of a line drawing before and after position correction.

FIG. 16 illustrates an example of an edge portion of a line drawing before and after position correction. When the position correction unit 3224 performs position correction of an image by rotation, scaling, or shifting, the edge of the line drawing may be distorted from a linear form as illustrated in FIG. 16.

Figure 17:
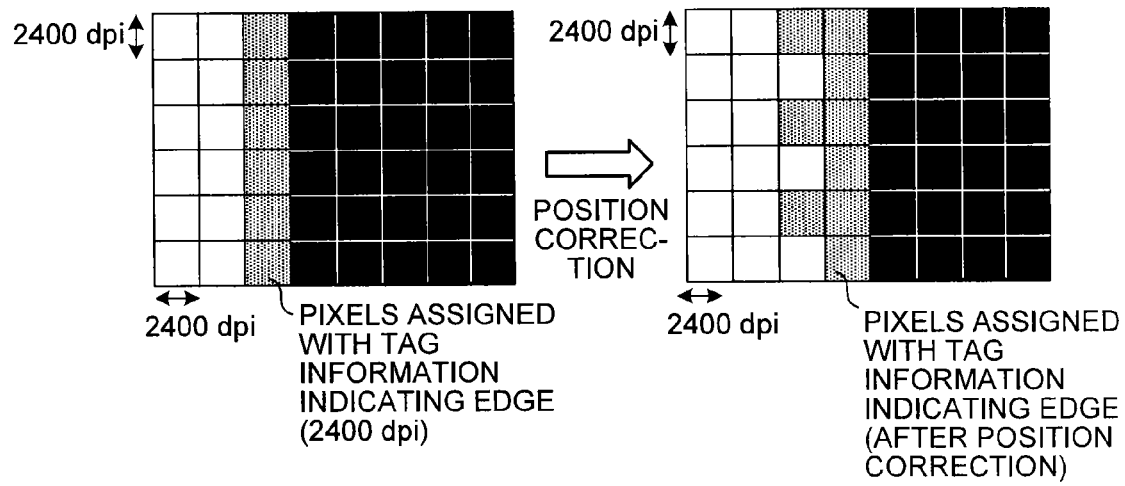
FIG. 17 illustrates an example of pixels to which the tag information indicating an edge of the line drawing in FIG. 16 is assigned.

FIG. 17 illustrates an example of pixels to which tag information indicating an edge of the line drawing in FIG. 16 is assigned. The position correction unit 3224 also performs position correction of the tag information through processing similar to the processing of the position correction of the image data. In this manner as illustrated in FIG. 17, the arrangement of pixels assigned with the tag information indicating an edge is distorted from a linear form, similarly to the image data.

Figure 18:
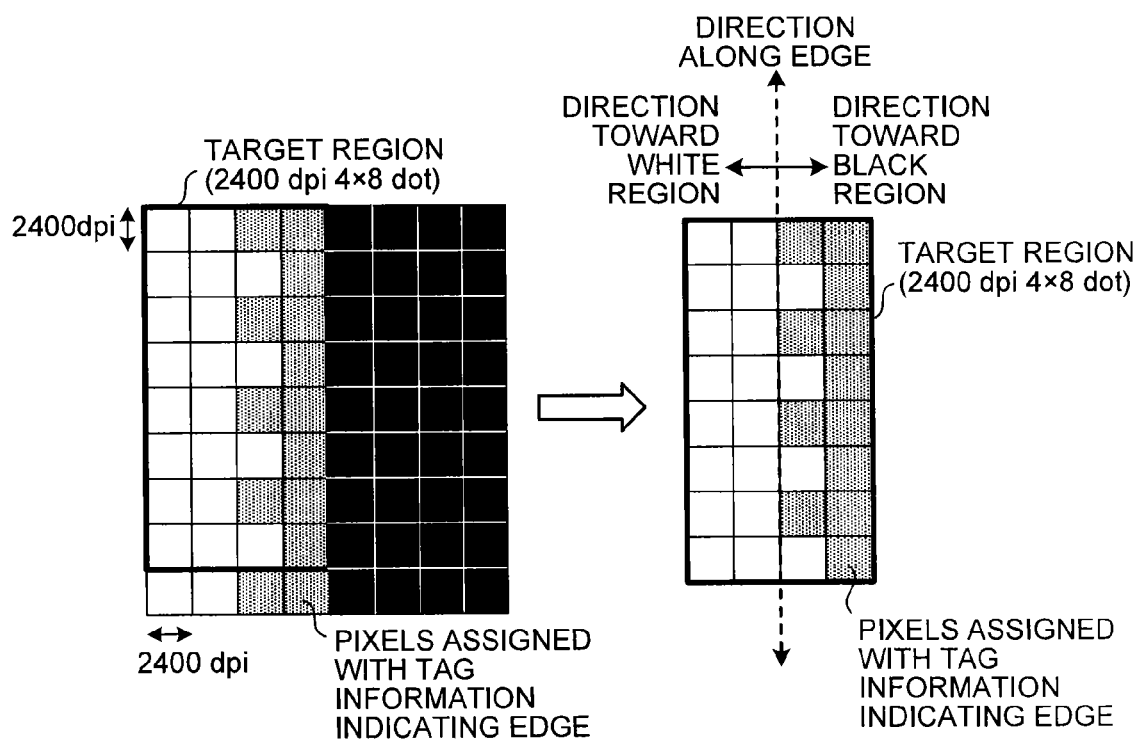
FIG. 18 illustrates an example of a target region and examples of the direction along the edge, the direction toward a white region, and the direction toward a black region.

FIG. 18 illustrates an example of the target region and examples of the direction along the edge, the direction toward a white region, and the direction toward a black region in the target region.

The identifying unit 3263 identifies the target region including an edge of a letter or a line in the image data with the first resolution. The target region has, for example, a predetermined size and shape and includes a pixel pattern determined under a predetermined condition.

An example identifying unit 3263 identifies a region which has a predetermined shape and includes at least a predetermined number of black pixel or pixels assigned with tag information indicating an edge and a predetermined number of white pixel or pixels as the target region.

In the example illustrated in FIG. 18, the identifying unit 3263 identifies the region of 4 dots (horizontal) by 8 dots (vertical) as the target region. Furthermore in the example illustrated in FIG. 18, the identifying unit 3263 identifies the region including eight or more black pixels assigned with tag information indicating an edge and eight or more white pixels as the target region. The condition under which the target region is thus identified is an example. Identification may be made under any condition as long as the region including an edge can be identified.

When the identifying unit 3263 identifies the target region, the direction detecting unit 3264 detects the direction of the edge in the target region. For example, the direction detecting unit 3264 may calculate the gravity center of the density of pixel value for each horizontal row of arrayed pixels and identify the direction of the line derived by linear approximation of calculated gravity centers of rows as the direction of the edge.

The direction detecting unit 3264 detects the direction toward the black region from the edge. That is, the direction detecting unit 3264 detects in which side of the edge in the target region does the black region exists. For example, the direction detecting unit 3264 detects which one of the density of the right side and the density of the left side is higher, for each row, from the gravity center of density. By applying the rule of majority to the detected result, the direction detecting unit 3264 identifies the direction toward the black region from the edge.

Figure 19:
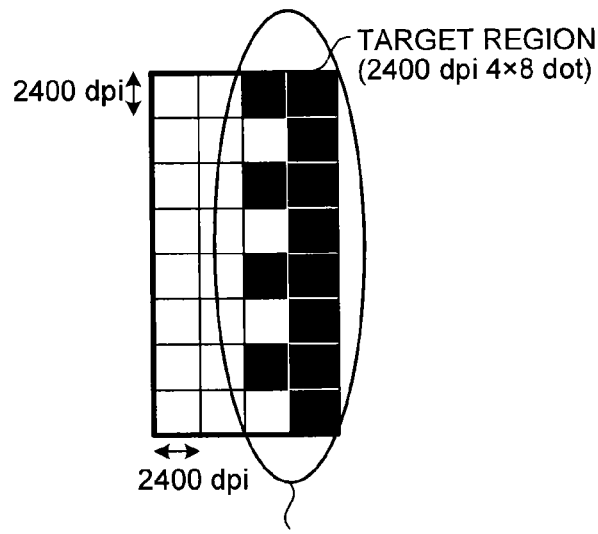
FIG. 19 illustrates a position of the target region in the image data and the position of a black pixel in the target region.

FIG. 19 illustrates the position of the target region in the image data and the position of a black pixel in the target region. The number detecting unit 3265 detects the number of black pixel or pixels with the first resolution in the target region. In the example illustrated in FIG. 19, the number detecting unit 3265 detects the number to be 12.

Figure 20:
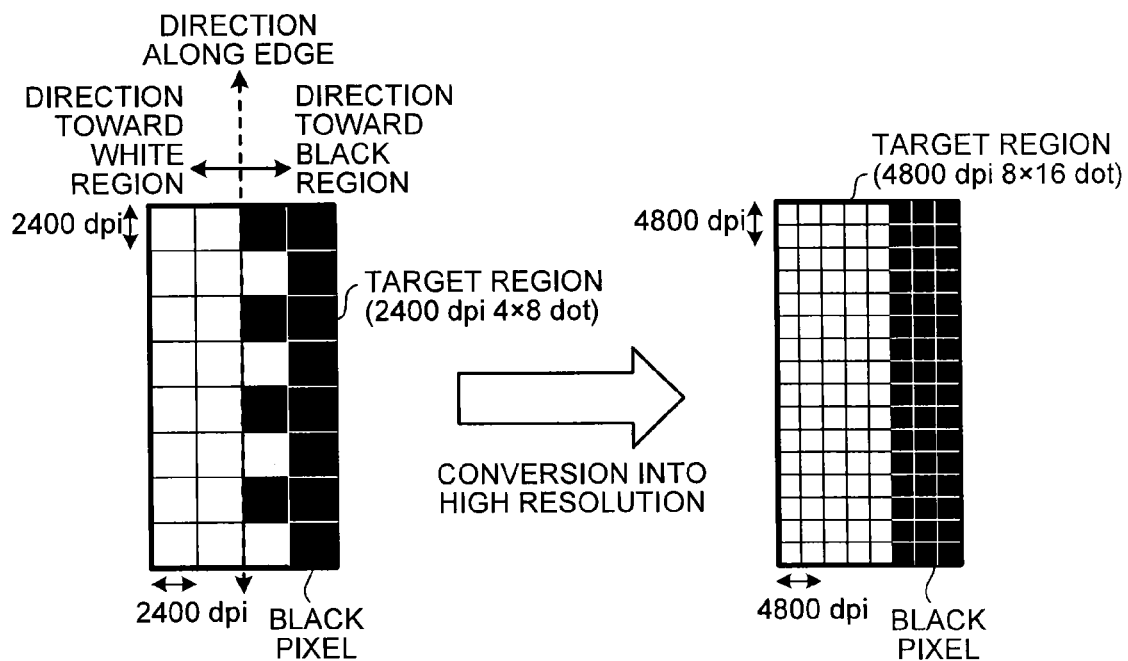
FIG. 20 illustrates a first example of a pixel pattern in which the target region is converted into a region with high resolution.

FIG. 20 illustrates a first example of a pixel pattern in which the target region is converted into a region with high resolution. The pattern generating unit 3266 generates a pixel pattern with the second resolution based on the direction of the edge, the direction toward the high region, and the number of black pixels.

The example pixel pattern with the second resolution includes black pixels with the second resolution by the number in accordance with the number of black pixels with the first resolution. The black pixels are disposed closer to the black region from the edge. The edge of the pixel pattern, which is the boundary between the white region and the black region, is smoothened along the detected direction along the edge.

In the example illustrated in FIG. 20, the target region is a rectangular region with the first resolution (2400 dpi) of 4 dots (horizontal) by 8 dots (vertical). The target region includes 12 black pixels. With regard to the target region, the direction of the edge is the vertical direction and the direction toward the black region is rightward direction.

Thus in the example illustrated in FIG. 20, the pixel pattern is a rectangular region with the second resolution (4800 dpi) of 8 dots (horizontal) by 16 dots (vertical). The pixel pattern includes 48 black pixels (12×4) disposed in the right side, and the left rim of the region of black pixels is smoothened along the edge (vertical direction).

Figure 21:
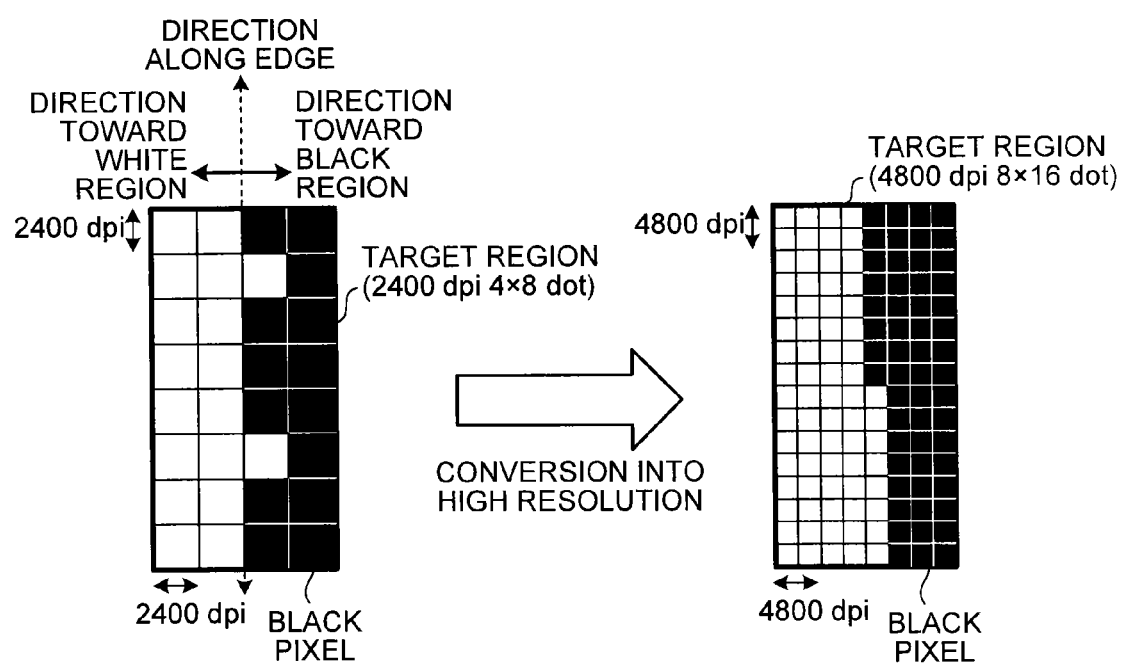
FIG. 21 illustrates a second example of a pixel pattern in which the target region is converted into a region with high resolution.

FIG. 21 illustrates a second example of a pixel pattern in which the target region is converted into a region with high resolution. In the example illustrated in FIG. 21, the target region is a rectangular region with the first resolution (2400 dpi) of 4 dots (horizontal) by 8 dots (vertical). The target region includes 14 black pixels. With regard to the target region, the direction of the edge is the vertical direction and the direction toward the black region is rightward direction.

Thus in the example illustrated in FIG. 21, the pixel pattern is a rectangular region with the second resolution (4800 dpi) of 8 dots (horizontal) by 16 dots (vertical). The pixel pattern includes 56 black pixels (14×4) disposed in the right side, and the left rim of the region of black pixels is smoothened along the edge (vertical direction).

Figure 22:
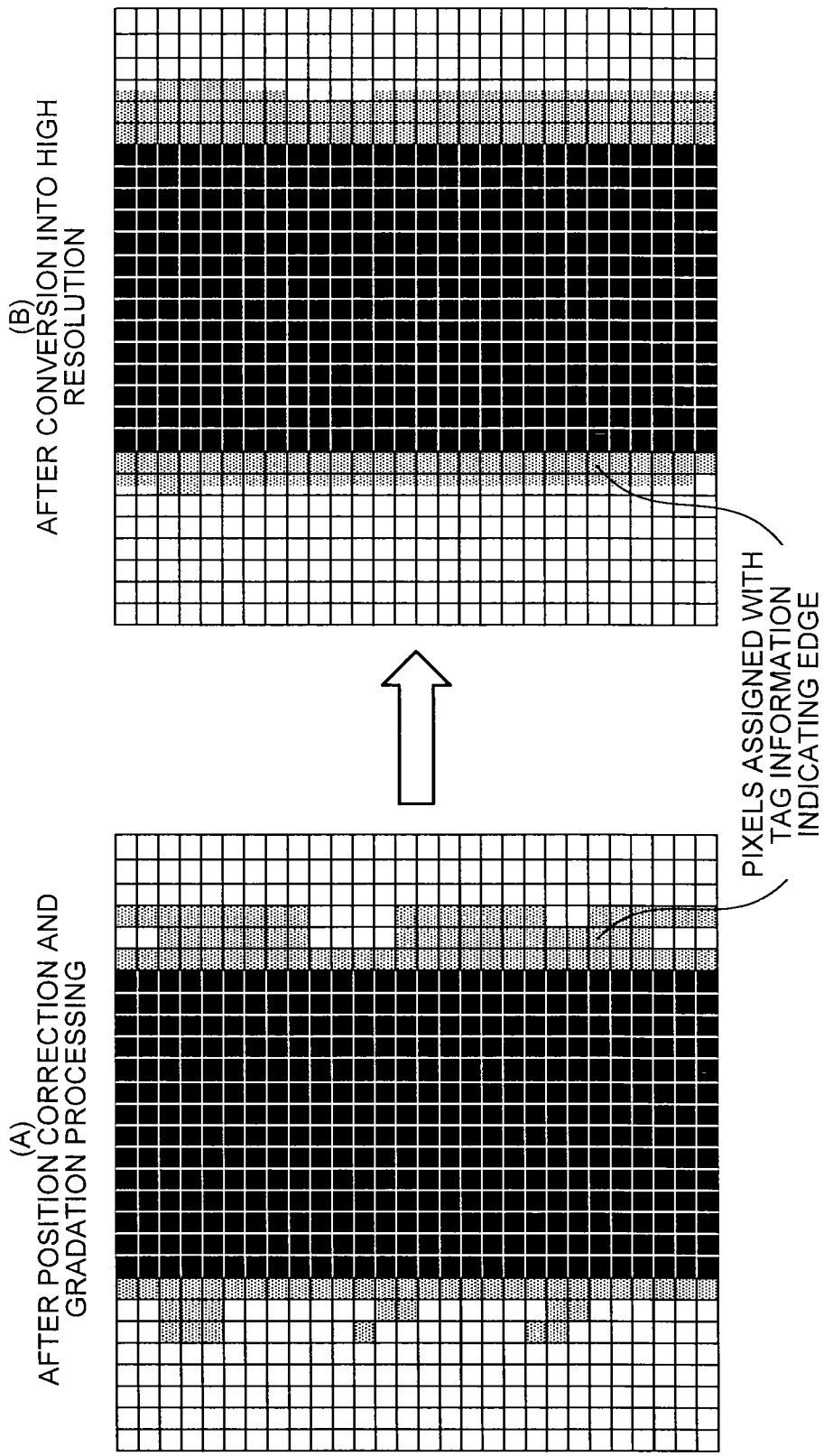
FIG. 22 illustrates an example of a line drawing processed through position correction and gradation processing and a line drawing after converted to have high resolution and smoothened.

FIG. 22 illustrates an example of a line drawing processed through position correction and gradation processing and a line drawing after converted to have high resolution and smoothened.

As illustrated at (a) in FIG. 22, the line drawing included in the image data processed through position correction and gradation processing has a distorted edge due to rotation, scaling, or shifting of the image.

The conversion unit 3252 replaces the target region including an edge with a pixel pattern with the second resolution generated by the pattern generating unit 3266. The image data with the second resolution resulting from the conversion into high resolution performed by the conversion unit 3252 has a smooth edge in the line drawing as illustrated at (b) in FIG. 22.

Figure 23:
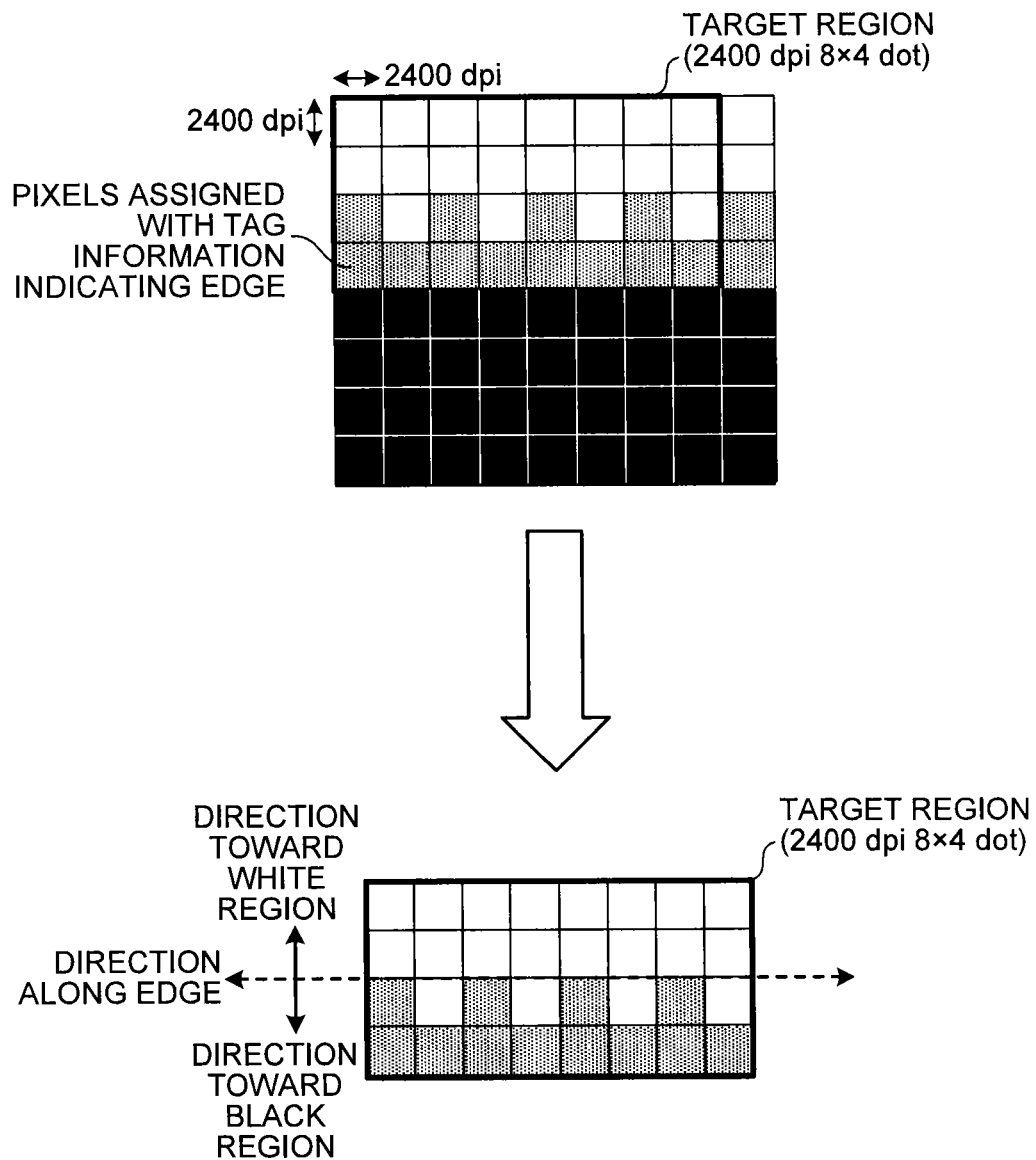
FIG. 23 illustrates an example of a laterally wide target region and examples of the direction along the edge, the direction toward a white region, and the direction toward a black region in the laterally wide target region.

FIG. 23 illustrates an example of a laterally wide target region and examples of the direction along the edge, the direction toward a white region, and the direction toward a black region in the laterally wide target region.

The target region to be identified by the identifying unit 3263 may have any shape. In the example illustrated in FIG. 23, the identifying unit 3263 identifies the region of 8 dots (horizontal) by 4 dots (vertical) as the target region. Furthermore in the example illustrated in FIG. 23, the identifying unit 3263 identifies the region including eight or more black pixels assigned with tag information indicating an edge and eight or more white pixels as the target region.

In the example illustrated in FIG. 23, the direction detecting unit 3264 may calculate the gravity center of the density of pixel value for each vertical column of arrayed pixels and identify the direction of the line derived by linear approximation of calculated gravity centers of vertical columns as the direction of the edge. For example, the direction detecting unit 3264 detects which one of the density of the upper side and the density of the lower side is higher, for each column, from the gravity center of density. By applying the rule of majority to the detected result, the direction detecting unit 3264 identifies the direction toward the black region from the edge.

FIG. 24 illustrate an example of a lateral line drawing processed through position correction and gradation processing and the lateral line drawing processed through conversion into high resolution.

As illustrated at (a) in FIG. 24, the lateral line drawing included in the image data processed through position correction and gradation processing has a distorted edge due to rotation, scaling, or shifting of the image.

The conversion unit 3252 replaces the laterally wide target region as illustrated in FIG. 23 with the pixel pattern with the second resolution generated by the pattern generating unit 3266. The image data with the second resolution resulting from the conversion into high resolution performed by the conversion unit 3252 has a smooth edge in the line drawing as illustrated at (b) in FIG. 24.

The color printer 2000 according to the embodiment can perform precise position correction of an image before gradation processing and perform image processing with high resolution without increasing the amount of image data to be transferred. Consequently, the color printer 2000 can print an image with a letter or a line having smoothened edge even when performing the registration between the front and back sides in two-sided printing.

An embodiment provides an effect that precise position correction of an image before gradation processing can be performed and image processing with high resolution can be performed without increasing the amount of transferred image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image by optical scanning, comprising:
   a light source;
   an image processing unit that processes image data;
   a modulation signal generation unit that generates a light source modulation signal;
   a light source drive unit that drives the light source based on the light source modulation signal; and
   a correction value identifying unit that identifies a correction value for correcting a registration error of the image which is to be formed, wherein
   the image processing unit performs first image processing of image data with a first resolution based on the correction value identified by the correction value identifying unit, the first image processing including deformation processing and gradation processing of the image data, and
   the modulation signal generation unit converts image data processed in the image processing unit into image data with resolution higher than the first resolution and performs second image processing.

2. The image forming apparatus according to claim 1, wherein
   the image processing unit includes:
      a deformation processing unit that performs deformation processing of input image data and outputs image data with the first resolution in which one pixel is represented with multiple bits, and
      a gradation processing unit that performs gradation processing of the image data with the first resolution in which one pixel is represented with multiple bits, and outputs image data with the first resolution in which one pixel is represented with one bit, and
   the modulation signal generation unit converts the image data with the first resolution in which one pixel is represented with one bit, into image data with a second resolution higher than the first resolution.

3. The image forming apparatus according to claim 2, wherein
   the modulation signal generation unit converts a target region including an edge of a letter or a line in image data with the first resolution into a pixel pattern with the second resolution having a smoothened edge.

4. The image forming apparatus according to claim 3 further comprising:
   a tag generation unit that generates tag information indicating whether a pixel is included in an edge of a letter or a line based on the input image data, wherein
   the deformation processing unit performs the same position correction of the tag information generated in the tag generation unit as position correction performed for the input image data and outputs tag information with the first resolution, and
   the image forming apparatus further comprising an identifying unit that identifies the target region in the image data with the first resolution based on the tag information with the first resolution.

5. The image forming apparatus according to claim 4, wherein
   the tag generation unit assigns tag information indicating an edge to a black pixel located in an edge of a letter or a line in the input image data.

6. The image forming apparatus according to claim 5, wherein the identifying unit identifies, as the target region, a region which has a predetermined shape and includes at least a predetermined number of black pixels assigned with tag information indicating an edge and a predetermined number of white pixels in the image data with the first resolution.

7. The image forming apparatus according to claim 6 further comprising:
a direction detecting unit that detects a direction along an edge between a white region and a black region and a direction toward the black region from the edge in the target region; and
a pattern generating unit that generates the pixel pattern with the second resolution in which black pixels are disposed closer to the black region from the edge in the region having the predetermined shape and an edge between the white region and the black region is smoothened in the direction along the edge, wherein
the modulation signal generation unit converts the target region in the image data with the first resolution into the pixel pattern generated by the pattern generating unit.

8. The image forming apparatus according to claim 7 further comprising
a number detecting unit that detects number of black pixels with the first resolution in the target region, wherein
the pattern generating unit generates the pixel pattern including black pixels with the second resolution whose number is in accordance with the number of black pixels with the first resolution.

9. The image forming apparatus according to claim 1, wherein the modulation signal generation unit and the light source drive unit are integrated in a single integrated device.

10. The image forming apparatus according to claim 1, wherein the light source is a vertical cavity surface emitting laser.

11. An image forming apparatus that forms an image by optical scanning, comprising:
a light source;
image processing circuitry that processes image data;
modulation signal circuitry that generates a light source modulation signal;
light source drive circuitry that drives the light source based on the light source modulation signal; and
correction value identifying circuitry that identifies a correction value for correcting a registration error of the image which is to be formed, wherein
the image processing circuitry performs first image processing of image data with a first resolution based on the correction value identified by the correction value identifying circuitry, the first image processing including deformation processing and gradation processing of the image data, and
the modulation signal generation circuitry converts image data processed in the image processing circuitry into image data with resolution higher than the first resolution and performs second image processing.

12. The image forming apparatus according to claim 11, wherein
the image processing circuitry includes:
deformation processing circuitry that performs deformation processing of input image data and outputs image data with the first resolution in which one pixel is represented with multiple bits, and
gradation processing circuitry that performs gradation processing of the image data with the first resolution in which one pixel is represented with multiple bits, and outputs image data with the first resolution in which one pixel is represented with one bit, and
the modulation signal generation circuitry converts the image data with the first resolution in which one pixel is represented with one bit, into image data with a second resolution higher than the first resolution.

13. The image forming apparatus according to claim 12, wherein
the modulation signal generation circuitry converts a target region including an edge of a letter or a line in image data with the first resolution into a pixel pattern with the second resolution having a smoothened edge.

14. The image forming apparatus according to claim 13 further comprising:
tag generation circuitry that generates tag information indicating whether a pixel is included in an edge of a letter or a line based on the input image data, wherein
the deformation processing circuitry performs the same position correction of the tag information generated in the tag generation circuitry as position correction performed for the input image data and outputs tag information with the first resolution, and
the image forming apparatus further comprising an identifying circuitry that identifies the target region in the image data with the first resolution based on the tag information with the first resolution.

15. The image forming apparatus according to claim 14, wherein
the tag generation circuitry assigns tag information indicating an edge to a black pixel located in an edge of a letter or a line in the input image data.

16. The image forming apparatus according to claim 15, wherein
the identifying circuitry identifies, as the target region, a region which has a predetermined shape and includes at least a predetermined number of black pixels assigned with tag information indicating an edge and a predetermined number of white pixels in the image data with the first resolution.

17. The image forming apparatus according to claim 16 further comprising:
direction detecting circuitry that detects a direction along an edge between a white region and a black region and a direction toward the black region from the edge in the target region; and
pattern generating circuitry that generates the pixel pattern with the second resolution in which black pixels are disposed closer to the black region from the edge in the region having the predetermined shape and an edge between the white region and the black region is smoothened in the direction along the edge, wherein
the modulation signal generation circuitry converts the target region in the image data with the first resolution into the pixel pattern generated by the pattern generating circuitry.

18. The image forming apparatus according to claim 17 further comprising
number detecting circuitry that detects number of black pixels with the first resolution in the target region, wherein
the pattern generating circuitry generates the pixel pattern including black pixels with the second resolution whose number is in accordance with the number of black pixels with the first resolution.

19. The image forming apparatus according to claim 11, wherein the modulation signal generation circuitry and the light source drive circuitry are integrated in a single integrated device.

20. The image forming apparatus according to claim 11, wherein the light source is a vertical cavity surface emitting laser.

* * * * *